(12) United States Patent
Rowe

(10) Patent No.: US 7,419,428 B2
(45) Date of Patent: *Sep. 2, 2008

(54) CASHLESS TRANSACTION CLEARINGHOUSE

(75) Inventor: Richard E. Rowe, Reno, NV (US)

(73) Assignee: IGT, Reno, NV (US)

( * ) Notice: Subject to any disclaimer, the term of this patent is extended or adjusted under 35 U.S.C. 154(b) by 485 days.

This patent is subject to a terminal disclaimer.

(21) Appl. No.: 10/406,911

(22) Filed: Apr. 2, 2003

(65) Prior Publication Data

US 2003/0171145 A1   Sep. 11, 2003

Related U.S. Application Data

(63) Continuation-in-part of application No. 09/993,163, filed on Nov. 16, 2001, now Pat. No. 6,866,586, which is a continuation-in-part of application No. 09/648,382, filed on Aug. 25, 2000, now Pat. No. 6,394,907, and a continuation-in-part of application No. 09/924,250, filed on Aug. 7, 2001, now Pat. No. 6,969,319.

(60) Provisional application No. 60/200,329, filed on Apr. 28, 2000.

(51) Int. Cl.
*A63F 13/00* (2006.01)

(52) U.S. Cl. .............................. 463/25; 463/16; 463/26; 463/29; 463/39; 463/42; 463/43

(58) Field of Classification Search .................. 463/25, 463/29, 42, 43, 26
See application file for complete search history.

(56) References Cited

U.S. PATENT DOCUMENTS 5,038,022 A   8/1991   Lucero
(Continued)

FOREIGN PATENT DOCUMENTS

DE   44 22 370   4/1986
(Continued)

OTHER PUBLICATIONS

Schneier B., "Applied Cryptography, Second Edition", 1996, Applied Cryptography. Protocols, Algorithms, and Source Code in C, pp. 31-38, 50-51, XP002248999, ISBN: 0-471-11709-9.
(Continued)

*Primary Examiner*—Robert E Pezzuto
*Assistant Examiner*—Sunit Pandya
(74) *Attorney, Agent, or Firm*—Weaver Austin Villeneuve & Sampson

(57) ABSTRACT

A disclosed cashless instrument transaction clearinghouse includes a network interface allowing the cashless instrument transaction clearinghouse to communicate with a number of gaming properties and a processor configured to enable the validation of cashless instruments at a gaming property different from where the cashless instrument was generated. Methods are provided at the cashless instrument transaction clearinghouse and at the gaming properties that enable cashless instrument transactions across multiple gaming properties including multi-site promotions. In addition, methods are provided at the cashless instrument transaction clearinghouse that allow 1) a transfer of resources from an account at a first gaming property to an account or device at a second gaming property, 2) account information access, 3) generation of cashless transaction threads comprising a plurality of related cashless transaction, 4) awards and services based upon properties of a cashless transaction thread and 5) local resource accounts maintained at the clearinghouse.

48 Claims, 17 Drawing Sheets

U.S. PATENT DOCUMENTS

| | | | |
|---|---|---|---|
| 5,083,271 A | 1/1992 | Thacher et al. | |
| 5,119,295 A | 6/1992 | Kapur | |
| 5,265,874 A | 11/1993 | Dickinson et al. | |
| 5,429,361 A | 7/1995 | Raven et al. | |
| 5,457,305 A | 10/1995 | Akel et al. | |
| 5,471,669 A | 11/1995 | Lidman | |
| 5,544,086 A | 8/1996 | Davis et al. | |
| 5,559,312 A | 9/1996 | Lucero | |
| 5,643,086 A | 7/1997 | Alcorn et al. | 463/29 |
| 5,651,548 A | 7/1997 | French et al. | |
| 5,735,742 A | 4/1998 | French | |
| 5,761,647 A * | 6/1998 | Boushy | 705/10 |
| 5,762,552 A | 6/1998 | Vuong et al. | 463/25 |
| 5,768,382 A | 6/1998 | Schneier et al. | 380/23 |
| 5,937,066 A | 8/1999 | Gennaro et al. | |
| 5,970,143 A | 10/1999 | Schneier et al. | |
| 6,012,832 A | 1/2000 | Saunders et al. | |
| 6,019,283 A | 2/2000 | Lucero | 235/380 |
| 6,048,269 A | 4/2000 | Burns et al. | |
| 6,099,408 A | 8/2000 | Schneier et al. | 463/29 |
| 6,104,815 A | 8/2000 | Alcorn et al. | 380/251 |
| 6,106,396 A | 8/2000 | Alcorn et al. | 463/29 |
| 6,149,522 A | 11/2000 | Alcorn et al. | 463/29 |
| 6,154,543 A | 11/2000 | Baltzley | |
| 6,165,072 A | 12/2000 | Davis et al. | 463/29 |
| 6,178,510 B1 | 1/2001 | O'Connor et al. | 713/201 |
| 6,302,793 B1 | 10/2001 | Fertitta et al. | |
| 6,368,219 B1 | 4/2002 | Szrek et al. | 463/42 |
| 6,394,907 B1 | 5/2002 | Rowe | |
| 6,500,067 B1 * | 12/2002 | Luciano et al. | 463/25 |
| 6,508,709 B1 | 1/2003 | Karmarkar | 463/43 |
| 6,511,377 B1 * | 1/2003 | Weiss | 463/25 |
| 6,560,581 B1 | 5/2003 | Fox et al. | |
| 6,678,664 B1 * | 1/2004 | Ganesan | 705/39 |
| 6,682,421 B1 | 1/2004 | Rowe et al. | |
| 6,739,972 B2 | 5/2004 | Flanagan-Parks et al. | |
| 6,866,586 B2 | 3/2005 | Oberberger et al. | |
| 2001/0032878 A1 | 10/2001 | Tsiounis et al. | |
| 2002/0032656 A1 | 3/2002 | Chen | |
| 2002/0045477 A1 | 4/2002 | Dabrowski | |
| 2002/0071557 A1 | 6/2002 | Nguyen | |
| 2002/0077178 A1 | 6/2002 | Oberberger et al. | |
| 2002/0082076 A1 | 6/2002 | Roser et al. | |
| 2002/0128059 A1 | 9/2002 | Baltz et al. | |
| 2003/0032656 A1 | 2/2003 | Kaminkow et al. | |
| 2003/0036425 A1 | 2/2003 | Kaminkow et al. | |
| 2003/0050831 A1 | 3/2003 | Klayh | |
| 2003/0171145 A1 | 9/2003 | Rowe | |
| 2003/0216967 A1 | 11/2003 | Williams | |
| 2005/0266919 A1 | 12/2005 | Rowe et al. | |
| 2006/0016883 A1 | 1/2006 | Silva et al. | |
| 2007/0060274 A1 | 3/2007 | Rowe et al. | |

FOREIGN PATENT DOCUMENTS

| | | |
|---|---|---|
| DE | 33441518 | 5/1986 |
| EP | 0744786 | 11/1996 |
| EP | 0 805 424 | 5/1997 |
| EP | 0933717 | 8/1999 |
| WO | WO 95/24689 | 9/1995 |
| WO | WO 99/01188 | 1/1999 |
| WO | 01/76710 A2 | 10/2001 |
| WO | WO 01/76710 | 10/2001 |
| WO | 01/84516 A2 | 11/2001 |
| WO | WO 02/32520 | 4/2002 |
| WO | WO 03/044746 | 5/2003 |

OTHER PUBLICATIONS

International Search Report dated Aug. 8, 2003, from related Foreign Patent Application No. PCT/US 02 3639, 3 pages.

International Search Report dated, Jan. 12, 2004, from related Foreign Patent Application No. PCT/US2004/010359, 4 pages.

Written Opinion of the International Searching Authority, dated Jan. 12, 2004, from related International Application No. PCT/US2004/010359, 7 pages.

Final Office Action from related U.S. Appl. No. 10/406,911, dated Jan. 22, 2007, 24 pages.

International Preliminary Examination Report dated Nov. 22, 2002, from related Foreign Patent Application No. PCT/US 01 13629, 2 pages.

Final Office Action from related U.S. Appl. No. 09/993,163, dated Jun. 23, 2004, 5 pages.

Office Action from related U.S. Appl. No. 09/993,163, Jan. 21, 2004, pp. 1-21.

"Introduction to Public-Key Cryptography," http://developer.netscape.com/docs/manuals/security/-pkin/contents.htm, Oct. 9, 1998, downloaded from the Internet on Jan. 8, 2004, pp. 1-20.

U.S. Appl. No. 09/631,855, filed Aug. 3, 2000.

U.S. Appl. No. 10/898,600, filed Aug. 3, 2000.

Summons to Attend Oral Proceedings pursuant to Rule 71(1) EPC, dated Sep. 29, 2006, from related European Patent Application No. 047439734.2, 12 pages.

Written Opinion of the International Searching Authority, dated Oct. 14, 2005, from related International Application No. PCT/US2004/010359, 8 pages.

European Patent Examination Report dated Nov. 17, 2006, from related Foreign Patent Application No. 01 928 944.6, 7 pages.

European Patent Examination Report dated Jan. 11, 2006 from related European Patent Application No. 04 749734.2-2221, 5 pages.

U.S. Office Action dated Feb. 21, 2008 from related U.S. Appl. No. 11/154,833, 12 pages.

Australian Office Action mailed Oct. 17, 2007 from related Australian Application No. 2006203189, 2 pages.

International Search Report and Written Opinion dated Feb. 14, 2008 from related PCT Application No. PCT/US2006/021422, 9 pages.

* cited by examiner

CASHLESS TRANSACTION CLEARINGHOUSE

CROSS-REFERENCE TO RELATED APPLICATIONS

This application is a continuation-in-part of and claims priority from U.S. patent application Ser. No. 09/993,163 entitled "AN AWARD TICKET CLEARINGHOUSE", filed Nov. 16, 2001; now U.S. Pat. No. 6,866,586 which is a continuation-in-part of and claims priority from U.S. patent application Ser. No. 09/648,382 entitled "AN AWARD TICKET CLEARINGHOUSE", filed Aug. 25, 2000, now U.S. Pat. No. 6,394,907 granted on May 28, 2002; which claims priority under 35 U.S.C. §119(e) from co-pending U.S. Provisional Patent Application No. 60/200,329, filed Apr. 28, 2000, naming Rick Rowe as inventors, and titled "AN AWARD TICKET CLEARINGHOUSE," each of which is incorporated herein by reference in its entirety and for all purposes. This application is also a continuation-in-part of and claims priority from U.S. application Ser. No. 09/924,250, entitled "GAME ORIENTED PROMOTIONAL CARD," filed Aug. 7, 2001, now U.S. Pat. No. 6,969,319 which is incorporated herein by in its entirety and for all purposes.

BACKGROUND OF THE INVENTION

This invention relates to game playing services for gaming machines such as slot machines and video poker machines. More particularly, the present invention relates to methods of utilizing cashless instruments on gaming machines.

There are a wide variety of associated devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

As technology in the gaming industry progresses, the traditional method of dispensing coins or tokens as awards for winning game outcomes is being supplemented by ticket dispensers which print ticket vouchers that may be exchanged for cash or accepted as credit of indicia in other gaming machines for additional game play. An award ticket system, which allows award ticket vouchers to be dispensed and utilized by other gaming machines, increases the operational efficiency of maintaining a gaming machine and simplifies the player pay out process. An example of an award ticket system is the EZ pay ticket system by International Game Technology of Reno, Nev. Award ticket systems and systems using other cashless mediums are referred to as cashless systems.

Cashless systems, such as the EZ pay ticket system, provide advantages to both game players and casino operators. For example, many players find it more convenient to carry an award ticket than a large number of coins. For gaming machine operators cashless systems tend to reduce gaming machine operating costs. For example, the infrastructure needed to remove and count indicia of credit (e.g. coins, tokens, bills) from the gaming machine may be eliminated or minimized when it is replaced with a cashless system, which reduces the gaming machine operating costs. Further, coin dust, which is potentially damaging to the components of the gaming machine (e.g. electronic components) may be eliminated or minimized when coin acceptors are replaced with the cashless system.

Currently, cashless systems have become very popular and have been embraced by customers. For example, ticket vouchers that are generated upon cashout and redeemed for cash or gaming machine credits within a particular casino are well accepted by game players. However, the ticket vouchers are only redeemable at the casino or the local property where the ticket was generated. Thus, the customer is not allowed to take the ticket voucher generated at one casino property and redeem the ticket voucher at another casino property. The limited redemption capabilities of cashless systems, including ticket vouchers, may be undesirable to an entertainment corporation that owns multiple casino properties. The entertainment corporation may desire that their customers have the ability to take a ticket voucher generated in one property to any of the other properties owned by the entertainment corporation.

Also, multi-site cashless capabilities may be desirable for an area or region such as the Las Vegas strip where a customer could cash out in casino A where a ticket voucher is generated. The customer could then take this ticket down the Las Vegas strip and into casino B where it could be inserted into a gaming machine's bill acceptor and redeemed for credit. In this example, casino A and casino B may or may not be owned by the same entertainment corporation. This type of multi-site validation capability is not possible with current cashless systems. Thus, in view of the above, it would be desirable to provide apparatus and methods for cashless systems that allow a cashless medium, including an award ticket voucher, generated at one site using one type of cashless system to be validated at a second site using the same or a different cashless system.

SUMMARY OF THE INVENTION

This invention addresses the needs indicated above by providing a cashless instrument transaction clearinghouse including a network interface allowing the cashless instrument transaction clearinghouse to communicate with a number of gaming properties and a processor configured to enable the validation of cashless instruments at a gaming property different from where the cashless instrument was generated. Methods are provided at the cashless instrument transaction clearinghouse and at the gaming properties that enable cashless instrument transactions across multiple gaming properties including multi-site promotions. In addition, methods are provided at the cashless instrument transaction clearinghouse that allow 1) a transfer of resources from an account at a first gaming property to an account or device at a second gaming property, 2) account information access, 3) generation of cashless transaction threads comprising a plurality of related cashless transaction, 4) awards and services based upon properties of a cashless transaction thread and 5) local resource accounts maintained at the clearinghouse.

One aspect of the present invention provides a cashless instrument transaction clearinghouse for facilitating the use of cashless instruments across separate gaming properties, each of which generates and validates cashless instruments. The cashless instrument transaction clearinghouse may be generally characterized as comprising: a) a network interface allowing the cashless instrument transaction clearinghouse to communicate with each of the separate gaming properties; and b) a processor configured or designed to (i) receive cashless instrument validation requests via the network interface from a first property for a cashless instrument presented at the first property where the cashless instrument was generated at a second property (ii) send information, via the network, to the second property requesting the second property to approve or reject the cashless instrument validation request, iii) validate cashless instrument storing a promotion. A cashless instrument validation request received at the clearinghouse may be for validating an indicia of credit value to enable i) a wager on a table game, ii) a play of a keno game, iii) a play of a bingo game, iv) a wager on a sporting event, v) a wager on a game of chance played on a gaming device located in a hotel room, vi) a wager on a game of chance on a gaming machine, vii) a food purchase, viii) a service purchase, ix) a merchandise purchase, x) an entertainment event purchase, xi) a rental purchase and xii) combinations thereof. The cashless instrument may be selected from the group consisting of a smart cart card, a debit card, a bar-coded ticket, a magnetic striped card and an EZ pay ticket voucher.

In particular embodiments, the cashless instrument storing the promotion may be redeemable for one of game play credit, merchandise and combinations thereof. Further, the cashless instrument storing the promotion may be generated at a gaming machine at the first property and redeemed at the second property. The promotion may be offered according to one or more promotion theme parameters. A first promotion theme parameter may be related to game play on of a specific type of gaming machine. The cashless instrument storing the promotion may only redeemable at a specific property connected to the cashless instrument clearinghouse. The cashless instrument transaction clearinghouse may further comprise a database for storing promotion theme parameters and promotion statistics.

In other embodiments, the processor may be further designed or configured to generate a cashless transaction thread comprising a plurality of related cashless instrument transactions and provide the promotion in response to properties of the cashless transaction thread matching one or more promotion theme parameters. The promotion theme parameters are one or more of i) a threshold amount spent on game play, ii) a threshold amount spent on food purchases, iii) a threshold amount spent on merchandise purchases, iv) a threshold amount spent on service purchases, v) a threshold amount spent on rental purchases, vi) a random selection of the cashless instrument thread, vii) a time, viii) a gaming property location, and ix) combinations thereof. The properties of the cashless instrument thread may be one or more of i) a total amount spent on game play for the cashless instrument transactions comprising the cashless instrument thread, ii) a total amount spent on food purchases for the cashless instrument transactions comprising the cashless instrument thread, iii) a total amount spent on merchandise purchases for the cashless instrument transactions comprising the cashless instrument thread, iv) a total amount on spent service purchases for the cashless instrument transactions comprising the cashless instrument thread, v) a total amount spent on rental purchases for the cashless instrument transactions comprising the cashless instrument thread and vi) combinations thereof.

The cashless instrument transactions comprising the cashless instrument thread may be one of i) cashless instrument transactions validated at the clearinghouse, ii) cashless instrument transactions validated at one or more gaming properties in communication with the clearinghouse and iii) combinations thereof. The plurality cashless instrument transactions comprising the cashless transaction thread may be related by one or more of the following a) a property where the cashless instrument transaction is generated, c) a time when the cashless instrument transaction is generated, d) a value of the cashless instrument transaction, f) a characteristic of a gaming device used in the cashless instrument transaction, g) a type of game played on a gaming machine used in the cashless instrument transaction, i) an individual user, j) a group of individual users, k) a group of properties where the cashless instrument transactions are generated, l) a cashless instrument used in the cashless instrument transaction, m) a group of cashless instruments used in the cashless instrument transaction and n) combinations thereof. The cashless instrument transaction clearinghouse may further comprise a transaction database including cashless transaction thread information.

In other embodiments, the generation of the promotion at the clearinghouse may comprise one of initiating i) a download of promotional credits, ii) an issuance of a comp, iii) an issuance of a discount coupon, iv) an issuance of a cash award and v) combinations thereof. The promotional credits may be non-cashable credits. The promotional credits, the comp, the discount coupon, the cash award and combinations thereof may be stored on a first cashless instrument generated at a cashless instrument generation site in communication with the cashless instrument transaction clearinghouse or may be stored in a user account. The promotional credits, the comp, the discount coupon, the cash award and combinations thereof that stored on the first cashless instrument or stored in the user account may be redeemable at a plurality of gaming properties. The clearinghouse may be capable of receiving cashless instrument validation requests for a validation of the promotional credits, the comp, the discount coupon, the cash award and combinations thereof stored on the first cashless instrument or stored in the user account.

In yet another embodiment, the processor may be capable of regulating access to the promotional credits stored on the first cashless instrument or stored in the user account. The promotional credits may be regulated to limit one or more of more of the following: i) a total amount used over a period of time, ii) a total amount used at a particular gaming property, iii) a total amount used at a group of gaming properties, iv) a use of the promotional credits on particular type of gaming machine, v) a use to a particular group of gaming machines, vi) a use of promotional credits only during certain time periods and vii) combinations thereof. The user account used for storing the promotional credits may be maintained at the clearinghouse, on a remote server in communication with the clearinghouse or combinations thereof.

Another aspect of the present invention provides a cashless instrument transaction clearinghouse for facilitating the use of cashless instruments across separate gaming properties, each of which generates and validates cashless instruments. The cashless instrument transaction clearinghouse may be generally characterized as comprising: a) a network interface allowing the cashless instrument transaction clearinghouse to communicate with each of the separate gaming properties; and b) a processor configured or designed to (i) receive cashless instrument validation requests via the network interface from a first property for a cashless instrument presented at the first property where the cashless instrument was generated at a second property (ii) send information, via the network, to the second property requesting the second property to approve or reject the cashless instrument validation request, iii) transfer an resource stored on a cashless instrument to an user account accessible to a game player. A cashless instrument validation request received at the clearinghouse may be for validating an indicia of credit value to enable i) a wager on a table game, ii) a play of a keno game, iii) a play of a bingo game, iv) a wager on a sporting event, v) a wager on a game of chance played on a gaming device located in a hotel room, vi) a wager on a game of chance on a gaming machine, vii) a food purchase, viii) a service purchase, ix) a merchandise purchase, x) an entertainment event purchase, xi) a rental purchase and xii) combinations thereof. The cashless instrument may be selected from the group consisting of a smart cart card, a debit card, a bar-coded ticket, a magnetic striped card and an EZ pay ticket voucher.

In particular embodiments, the processor may be further configured or designed to provide account information stored in one or more different types of user accounts. The one or more different types of user accounts may be selected from the group consisting of a bank account, a credit card account, a debit card account, a casino account and a loyalty program account and the account information for the one or more different types of user accounts may be stored at i) the clearinghouse, ii) one more gaming properties, and iii) combinations thereof. Further, the processor may communicate via the network interface with a plurality of remote devices each of the remote devices maintaining one or more different types of user accounts.

In other embodiments, the clearinghouse may further comprise an account database for storing account information in the user account for a plurality of different game players. The account information may comprise i) an account number and ii) user identification information. The clearinghouse may further comprise a router where the router contains routing information allowing the processor to determine a gaming property location for the user account accessible to the game player. The router may also contain routing information allowing the processor to send information to the gaming property location for the user account accessible to the game player.

In yet other embodiments, the processor may be further designed or configured to enable the transfer of an resource stored on one of a i) first user account on a first server accessible to the game player, ii) a first gaming device or iii) a first cashless instrument to one of a second gaming device, a second user account on a second server accessible to the game player or a second cashless instrument. The first server or the second server may be located at the clearinghouse. The first gaming device or the second gaming device may be a gaming machine. The first user account or the second user account accessible to the game player may be one of a bank account, a loyalty program account, a credit card account, a debit card account and a casino account.

The resource may be one of an indicia of credit or points used in a loyalty program. Further, the processor may be designed or configured to regulate access to the resource. Access to the resource may be regulated to limit one or more of more of the following: i) a total amount of the resource used over a period of time, ii) a total amount of the resource used at a particular gaming property, iii) a total amount of the resource used at a group of gaming properties, and iv) combinations thereof.

Another aspect of the present invention is provides a method of validating a cashless instrument storing a promotion at a first property using a cashless instrument transaction clearinghouse where the cashless instrument was generated at a second property. The method may be generally characterized as comprising 1) receiving a first transaction validation request containing transaction information from the first property wherein the first transaction validation request requests validation of the cashless instrument storing the promotion; 2) sending a second transaction validation request to the second property; 3) receiving a first transaction validation reply from the second property; and 4) sending a second transaction validation reply to the first property where the second transaction validation reply contains transaction information indicating the validation of cashless instrument storing the promotion has been approved or has been rejected.

When validation of the cashless instrument storing the promotion is approved, the cashless instrument may be used to redeem one of promotional credits, a comp, a discount coupon, merchandise and combinations thereof. The promotional credits may be non-cashable credits. In a specific embodiment, the cashless instrument storing the promotion may be only redeemable at a specific property. The cashless instrument may be selected from the group consisting of a smart cart card, a debit card, a bar-coded ticket, a magnetic striped card and an EZ pay ticket voucher.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

These and other features and advantages of the invention will be spelled out in more detail below with reference to the associated drawings.

DESCRIPTION OF THE PREFERRED EMBODIMENTS

Figure 1:
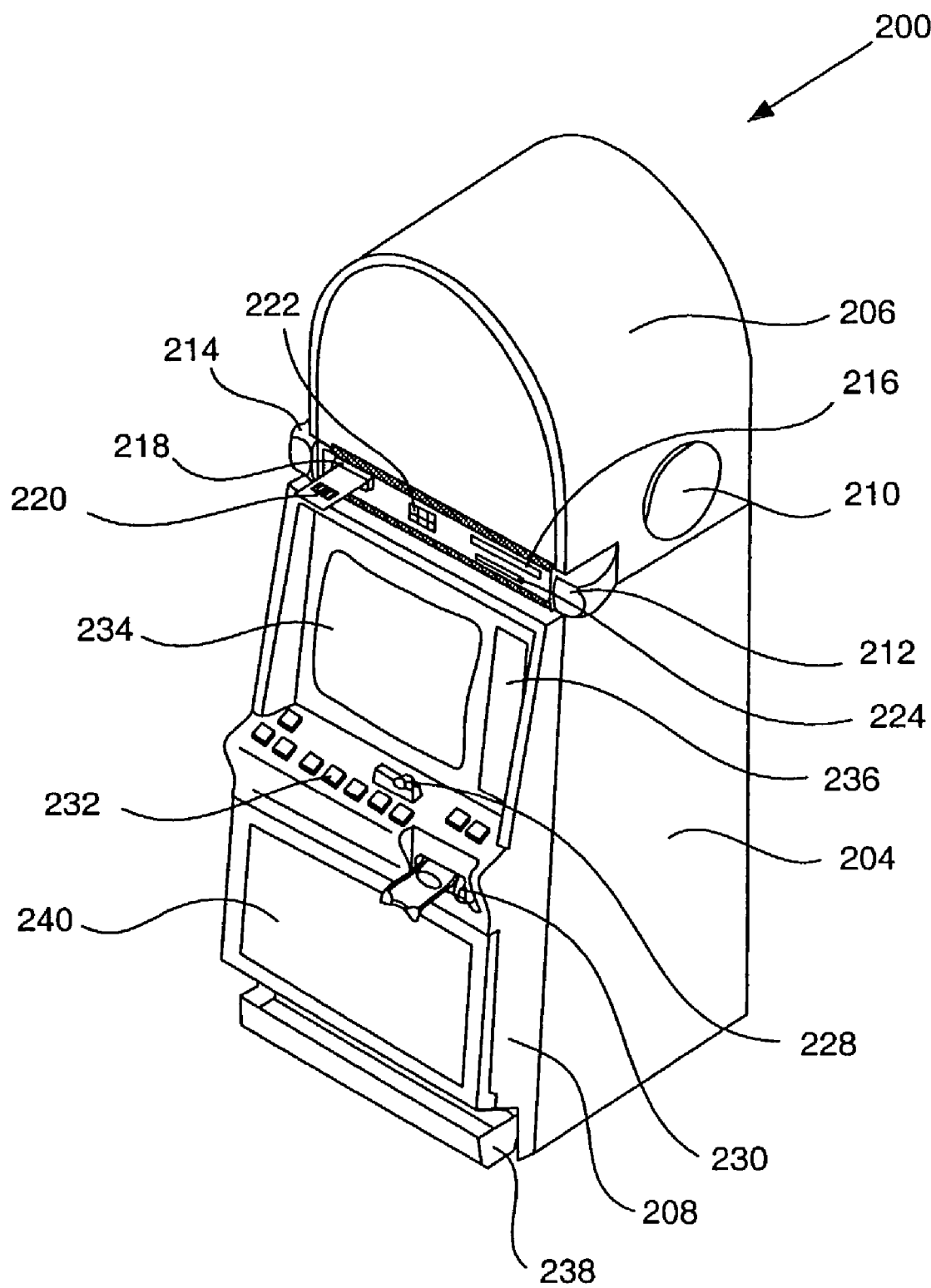
FIG. 1 is a perspective drawing of a gaming machine having a top box and other devices.

Turning first to FIG. 1, a video gaming machine 200 of the present invention is shown. Machine 200 includes a main cabinet 204, which generally surrounds the machine interior (not shown) and is viewable by users. The main cabinet includes a main door 208 on the front of the machine, which opens to provide access to the interior of the machine. Attached to the main door are player-input switches or buttons 232, a coin acceptor 228, and a bill validator 230, a coin tray 238, and a belly glass 251. Viewable through the main door is a video display monitor 234 and an information panel 236. The display monitor 234 will typically be a cathode ray tube, high resolution flat-panel LCD, or other conventional electronically controlled video monitor. The information panel 236 may be a back-lit, silk screened glass panel with lettering to indicate general game information including, for example, the number of coins played. The bill validator 230, player-input switches 232, video display monitor 234, and information panel are devices used to play a game on the game machine 202. The devices are controlled by circuitry (not shown) housed inside the main cabinet 204 of the machine 200. Many possible games, including traditional slot games, video slot games, video poker, and video keno, may be provided with gaming machines of this invention.

The gaming machine 200 includes a top box 206, which sits on top of the main cabinet 204. The top box 206 houses a number of devices, which may be used to add features to a game being played on the gaming machine 200, including speakers 210, 212, 214, a ticket printer 218 which may print bar-coded tickets 220, a key pad 222 for entering player tracking information, a florescent display 216 for displaying player tracking information, a card reader 224 for entering a magnetic striped card containing player tracking information. Further, the top box 206 may house different or additional devices than shown in FIG. 1. For example, the top box may contain a bonus wheel or a back-lit silk screened panel which may be used to add bonus features to the game being played on the gaming machine. During a game, these devices are controlled and powered, in part, by circuitry (not shown) housed within the main cabinet 204 of the machine 200.

Understand that gaming machine 200 is but one example from a wide range of gaming machine designs on which the present invention may be implemented. For example, not all suitable gaining machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Returning to the example of FIG. 1, when a user wishes to play the gaming machine 200, he or she inserts cash through the coin acceptor 228 or bill validator 230. In addition, the player may use a cashless instrument of some type to register credits on the gaming machine 200. For example, the bill validator 230 may accept a printed ticket voucher, including 220, as an indicia of credit. As another example, the card reader 224 may accept a debit card or a smart card containing cash or credit information that may be used to register credits on the gaming machine. Typically, the information contained on the cashless instrument, including the ticket voucher, smart card or debit card, is validated by a cashless system. The cashless instrument, including the ticket voucher, smart card or debit card, may have been generated at the same property, for example a first casino where the gaming machine 200 is located or the ticket may have been generated at another property for example a second casino. Details of the components of a cashless system and validation methods used in a preferred embodiment of a cashless system are described with reference to FIGS. 2-7.

The cashless instrument typically contains information used to register credits on the gaming machine, including gaming machine 200, and validate the registration transaction. For example, when a ticket voucher is used as a cashless instrument, the printed ticket voucher may contain information including: 1) a ticket value, 2) a ticket issue date, 3) a ticket issue time, 4) a ticket transaction number, 5) a machine ID, 6) a ticket issue location and 7) a ticket owner. Information such as the ticket value, the ticket issue date, the ticket issue time, the ticket number and the machine ID may be common to cashless systems that generate and validate tickets issued at a single property. However, information such as the ticket issue location and the ticket owner may be needed to allow multi-site generation and validation of cashless instruments. In addition, other types of information, besides the information listed above, may be stored on the cashless instrument. For example, the ticket may contain information regarding a promotional prize that may be won by the player when the ticket voucher is utilized in the gaming machine 200. The promotional prize may involve multiple properties and particular types of gaming machines.

The information on the cashless instrument may be recorded on the cashless instrument when the cashless instrument is generated. For example, in the case of the ticket voucher, the generation of the ticket voucher may refer to the actual printing of the ticket voucher on paper or some other medium. A unique bar-code may be printed on the ticket voucher which may be read with a bar-code scanner to obtain information from the ticket. The ticket voucher, including 220, may be printed from a printer, including printer 218. In the case of the smart card or debit card, the generation of the smart card or debit card refers to storing or encoding this information on the smart card or debit card. The generation of the debit card or smart card may occur when the smart card or debit card is inserted into the card reader 224 in the gaming machine 200 or at another site where smart cards or debit cards are issued. For example, smart cards or debit cards may be generated at ATM like terminals, at a cashier station when a player cashes out or prepaid smart cards or debits may be purchased within the gaming property (e.g. casino).

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 232, the video display screen 234 or using some other device which enables a player to input information into the gaming machine. During certain game events, the gaming machine 200 may display visual and auditory effects that can be perceived by the player. These effects add to the excitement of a game, which makes a player more likely to continue playing. Auditory effects include various sounds that are projected by the speakers 210, 212, 214. Visual effects include flashing lights, strobing lights or other patterns displayed from lights on the gaming machine 200 or from lights behind the belly glass 240.

After the player has completed a game, a cashless instrument may be generated at the gaming machine 200. The cashless instrument may be a printed ticket voucher, a smart card, debit card or other cashless medium. For example, the player may decide to cashout and may receive the ticket 220 from the printer 218, which may be used for further games or to redeem a prize. Further, the player may receive a ticket 220 for food, merchandise, game services or other promotions from the printer 218 that may be used at the gaming property where the gaming machine is located or at other gaming properties. The player may view cashless instrument transaction information on the video display screen 234 or the florescent screen 216. For instance, when a player cashes out from the gaming machine, the value stored on the cashless instrument may be displayed using the video display 234. As another example, when a promotion ticket 220 is printed out from the printer 218 that is valid at a number of other gaming properties, a map may be displayed on the video display screen indicating where the other gaming properties are located.

Figure 2A:
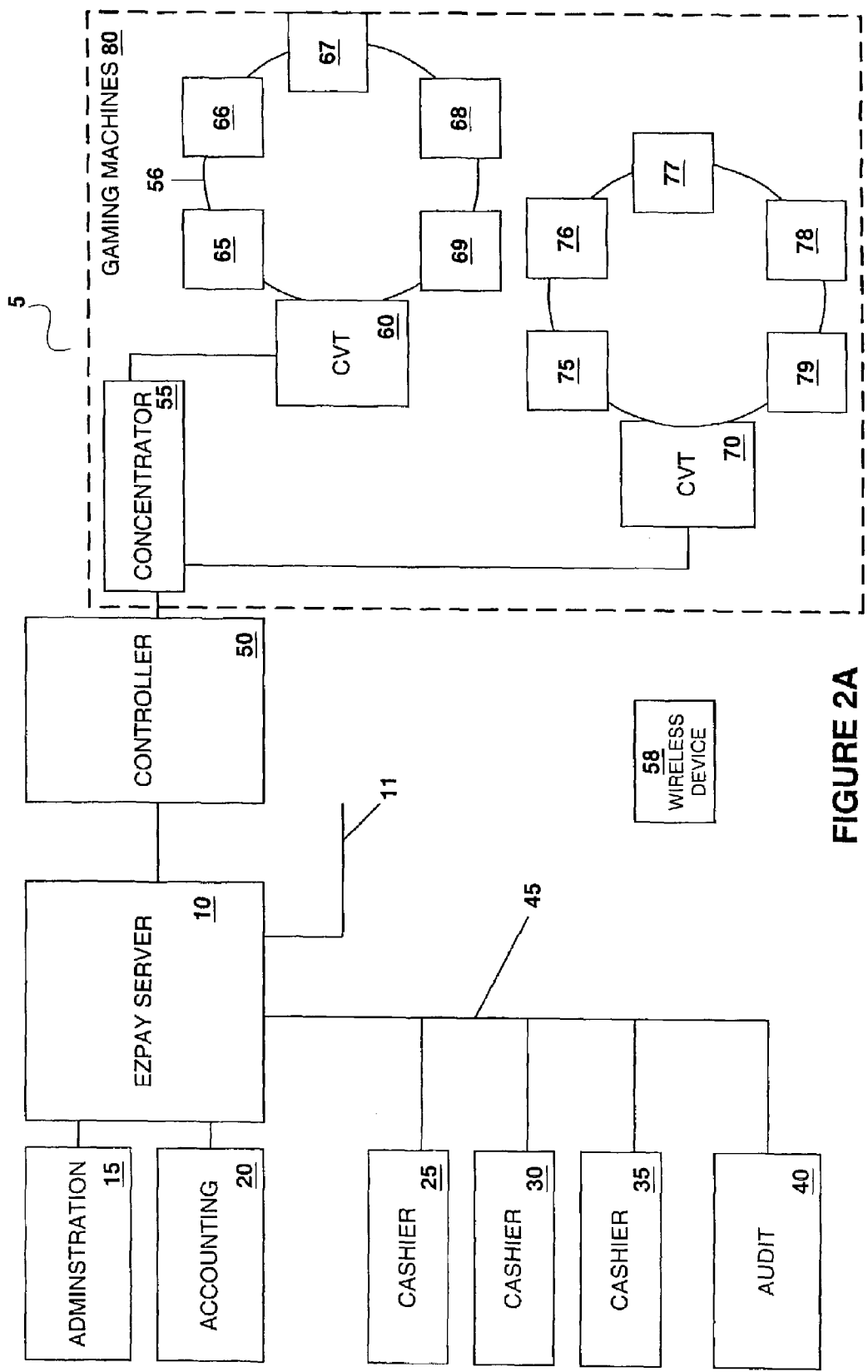
FIG. 2A is a block diagram of the components of a cashless system using the EZ pay ticket voucher system.

FIG. 2A is a block diagram of the components of a cashless system using the EZ pay ticket voucher system for one embodiment of the present invention. A cashless system is the hardware components and software components needed to generate and validate cashless instruments. Components of an cashless system may include 1) data acquisition hardware, 2) data storage hardware, 3) cashless instrument generation and validation hardware (e.g. printers, card readers, ticket acceptors, validation terminals, etc.), 3) auditing software, 4) cashless instrument validation software and 5) database software. Many types of cashless systems are possible and are not limited to the components listed above or embodiments such as the EZ pay ticket voucher system. Typically, a cashless system is installed at each property utilizing cashless instruments. To allow multi-site validations of cashless instruments, the cashless systems at each property are linked to a cashless instrument transaction clearinghouse. The relation of multiple cashless systems connected to a cashless instrument transaction clearinghouse are described with reference to FIG. 3. The details of a cashless system at one property are described below with reference to FIGS. 2A and 2B.

Returning to FIG. 2A, a first group of gaming machines, 65, 66, 67, 68, and 69 is shown connected to a first clerk validation terminal (CVT) 60 and a second group of gaming machines, 75, 76, 77, 78 and 79 is shown connected to a second CVT 70. These gaming machines and their associated cashless hardware are referred to as the block, gaming machines 80 in the figure. All of the gaming machines print ticket vouchers which may be exchanged for cash or accepted as credit of indicia in other gaming machine located within the property 5. In this example, the ticket voucher serves as a cashless instrument. In addition, the gaming machines may accept ticket vouchers issued at a different property from property 5 where the different property utilizes the same or a different cashless system as compared to property 5.

When the CVTs are not connected to one another, a ticket voucher printed from one gaming machine may be only be used as indicia of credit in another gaming machine which is in a group of gaming machines connected to the same clerk validation terminal. For example, a ticket voucher printed from gaming machine 65 might be used as credit of indicia in gaming machines 66, 67, 68 and 69, which are each connected to the CVT 60, but not in gaming machines 75, 76, 77, 78, and 79, which are each connected to the CVT 70. In an analogous manner, when the cashless systems from one property are not connected together then a ticket vouchers generated from gaming machine 66 may be not be used at property different from property 5.

The CVTs, 60 and 70, store cashless instrument transaction information corresponding to the outstanding cashless instrument, including ticket vouchers, smart cards and debit cards, that are waiting for redemption. In this embodiment, the CVTs are separate from the gaming machine. However, the cashless instrument information may be also be stored within each gaming machine or one gaming machine may functionally act as a CVT for a group of gaming machines eliminating the separate CVT hardware. In addition, cashless instrument transaction information may be stored in a cashless server including the EZ pay server 10. The cashless instrument transaction information may be used when the tickets are validated and cashed out or redeemed in some other manner. The CVTs 60 and 70 may store the information for the ticket vouchers printed by the gaming machines connected to the CVT. For example, CVT 60 stores ticket voucher information for ticket vouchers printed by gaming machines 65, 66, 67, 68, and 69. When a ticket is printed out, ticket information is sent to the CVT using a communication protocol of some type from the gaming machine. For example, the gaming machine may send transaction information to the CVT which is part of the cashless system using the slot data system manufactured by Bally's Gaming Systems (Alliance Gaming Corporation, Las Vegas, Nev.) or the slot acquisition system manufacture by IGT, Reno, Nev.

In this embodiment, when a player wishes to cash out a ticket, the player may redeem vouchers printed from a particular gaming machine at the CVT associated with the gaming machine or any other CVT which is part of the cashless system associated with the CVT. For example, since CVT 60 and CVT 70 are connected as part of a single cashless system to the EZ pay server 10, a player may redeem vouchers or utilize vouchers at the gaming machines, the CVT's (60 or 70), the cashiers (25, 30, 35, and 40) or the wireless cashiers 58. The CVTs, cashiers, wireless cashiers and gaming machines may be referred to as "cashless validation sites." To cash out the ticket voucher, the ticket voucher is validated by comparing information obtained from the ticket with information stored within the CVT. After a ticket voucher has been cashed out, the CVT marks the ticket paid in a database to prevent a ticket voucher with similar information from being cashed multiple times.

Not all cashless systems may utilize CVTs, many of the functions of the CVT may be transferred to the cashless server, including the EZ pay server 10, eliminating the function within the CVT. For instance, the cashless instrument transaction information may be stored in the cashless server instead of the CVT. Thus, the need to store cashless instrument transaction information within the CVT may be eliminated.

In this embodiment using the EZ pay system, multiple groups of gaming machines connected to CVTs are connected together in a cross validation network 45. The cross validation network is typically comprised of one or more concentrators 55 which accepts inputs from two or more CVTs and enables communications to and from the two or more CVTs using one communication line. The concentrator is connected to a front end controller 50 which may poll the CVTs for ticket voucher information. The front end controller is connected to an EZ pay server 10 which may provide a variety of information services for the award ticket system including accounting 20 and administration 15.

In this invention, one hardware and software platform allowing cashless instruments to be utilized at all of the cashless validation sites (e.g. cashier stations, gaming machines, wireless cashiers and CVTs) within a single property and across multiple properties is referred to as a "cashless server". In this embodiment, the EZ pay server 10 may function as the cashless server. Usually, the cashless server is a communication nexus in the cross validation network. For instance, the EZ pay server 10 is connected to the cashiers, wireless devices, remote cashless instrument transaction clearinghouse, CVTs and the gaming machines via the CVTs.

The cross validation network allows ticket vouchers generated by any gaming machine connected to the cross validation to be accepted by other gaming machines in the cross validation network 45. Additionally, the cross validation network allows a cashier at a cashier station 25, 30, and 35 to validate any ticket voucher generated from a gaming machine within the cross validation network 45. To cash out a ticket voucher, a player may present a ticket voucher at one of the cashier stations 25, 30, and 35 or to a game service representative carrying a wireless gaming device for validating ticket vouchers. A more complete discussion of the details of the wireless gaming device 58, including hardware and utilization, are described in copending U.S. patent application Ser. No. 09/544,844 entitled a WIRELESS GAME ENVIRONMENT filed Apr. 7, 2000 by Rowe the entire specification of which is incorporated herein by reference. Information obtained from the ticket voucher is used to validate the ticket by comparing information on the ticket with information stored on one of the CVTs connected to the cross validation network. In addition, when the ticket voucher was issued at another property, the information on the ticket may be stored at the other property. Thus, to validate the ticket voucher, the EZ pay server may have to communicate with the cashless instrument transaction clearinghouse via the remote connection 11 to obtain the information necessary to validate the ticket voucher.

As tickets are validated, this information may be sent to audit services computer 40 providing audit services, the accounting computer 20 providing accounting services or the administration computer 15 providing administration services. In another embodiment, all of these services may be provided by the cashless server including the EZ pay server 10. Examples of auditing services, which may be provided by cashless system software residing on the auditing computer 40 include 1) session reconciliation reports, 2) soft count reports, 3) soft count verification reports, 4) soft count exception reports, 5) machine ticket status reports and 5) security access report. Examples of accounting services, which may be provided by cashless system software residing on the accounting computer 20 include, 1) ticket issuance reports, 2) ticket liability reports, expired ticket reports, 3) expired ticket paid reports and 4) ticket redemption reports. Examples of administration services, which may be provided by cashless system software residing on the administration computer 15 include 1) manual ticket receipt, 2) manual ticket report, 3) ticket validation report, 4) interim validation report, 5) validation window closer report, 6) voided ticket receipt and 7) voided ticket report.

Figure 2B:
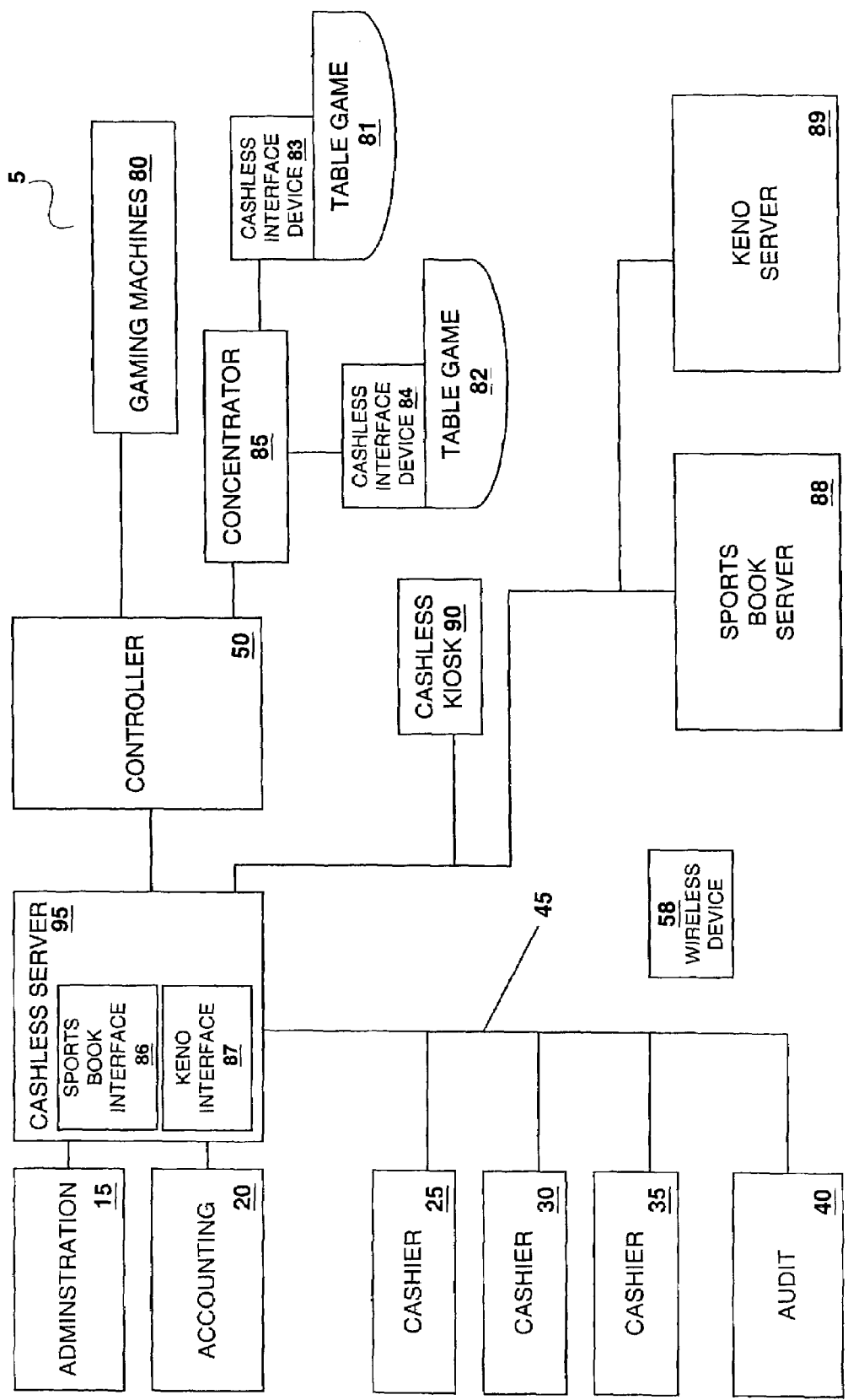
FIG. 2B is a block diagram of the components of cashless system for one embodiment of the present invention.

FIG. 2B is a block diagram of the components of cashless system for one embodiment of the present invention. The cashless system includes a cashless server 95, such as the EZpay server 10 described with respect to FIG. 2A. In this embodiment, the cashless server 95 is connected to gaming machines 80 (described with respect to FIG. 2A), table games (e.g., 81 and 82), a keno server 89, a sports book server 88, a bingo server (not shown) and a casino kiosk 90. The table games may be one of any table games found in a casino, such as but not limited to, poker, black jack, craps, roulette, baccarat, pai-gow poker and dice games.

Many different cashless system architectures are possible with the present invention and the system is not limited to the example in FIG. 2B. For instance, cashless server 95 may be connected to just the keno server 89 and the gaming machines 80 and not the sports book server 88 and the table games. As another example, the cashless server 95 may be connected to additional gaming devices and servers not shown in the figure.

The keno server 89 may provide keno games and keno tickets as part of keno system. The keno server 89 may be connected to a plurality of gaming devices used to issue and redeem keno tickets. The bingo server may provide bingo games as part of a bingo system and may be connected to a plurality of gaming devices that provide bingo games. The sports book may be used to provide sports wagering as part of a sports wagering system. The sports book may be connected to a plurality of gaming devices used to issue and redeem sports wager tickets. In the past, the keno system, the bingo system and the sports wagering system have been operated as independent systems. Further, these systems typically only take cash only and casino chips may not be used to make sports wagers or for keno game play.

Traditionally, the keno system, the sports wagering system, the bingo system, the table games have not been operated with a cashless system as has been described in regards to the gaming machines 80 in FIG. 2A. In one embodiment of the present invention, all of these systems are connected to a cashless system, such as via the cashless server 95. Thus, cashless instruments with a cash value or a promotional credits (non-restricted or restricted) may be generated and validated for game play at the game machines, table games (i.e., table games and associated hardware), the keno system (keno server and associated hardware), the sports wagering system (sports book server and associated hardware) and the bingo system (bingo server and associated hardware) and used interchangeably between these venues.

As an example of interchangeability between the venues, a player may cashout at one of the gaming machine in the gaming machines 80 and receive a cashless instrument with the cash value. The player may then present the cashless instrument with the cash value at one of the table games 81 and 82. Using one of the cashless interface devices 83 and 84, the cashless instrument may be validated at the cashless server 95. For instance, the cashless server may contact the CVT connected to a gaming machine described in FIG. 2A where the cashless instrument was generated to validate the cashless instrument.

After validation of the cashless instrument, the cash value on the cashless instrument or a portion of the cash value may be applied to game play. For example, at a black jack game, a roulette game or a craps game, the portion of the cash value used for game play may be exchanged for casino chips or another type of indicia of credit used to play the game. After a player has completed a table game, the player may cash out and a second cashless instrument with a cash value, such as printed ticket voucher, may be generated by one of the cashless interface devices, 83 or 84. Further, when the player cashes out, an additional cashless instrument, with restricted or non-restricted promotional credits that may be used for game play, may be generated by one of the cashless interface devices 84 or 84.

An advantage of this approach is that the player may find carrying a single cashless instrument more desirable then carrying a handful of casino chips. Further, as will be described below, the cashless instrument may have more utility in that it can be used in more locations and for more activities then the casino chips, which may be desirable to the player. In addition, a handful of casino chips may be more easily lost and harder to keep track of then a cashless instrument, which may make cashless instruments more desirable to the player.

With a cashless system as described, it is easier track where player resources are being utilized and accounting procedures may be simplified which is a benefit to gaming operators such as casinos. In one embodiment, the casino chips may be primarily used for game play at the gaming tables and players will be encouraged to leave their chips at the table and leave only with a cashless instrument. To encourage this type of behavior, random promotions at cash out of the chips for a cashless instrument may be offered, such as promotional credits. This approach may be desirable for casinos because it may reduce the overhead associated with 1) auditing procedures that they are required to implement by law in regards to the use of casino chips, 2) restocking tables with casino chips, 3) cashing out casino chips and 4) the acceptance of competitors casino chips. These processes require a lot of manual labor and provide many theft opportunities. With a cashless system, many of the processes can be automated and many theft opportunities eliminated which is desirable to casinos.

For example, when a cashless instrument generated at a first casino is presented at a second casino for the play of a table game at the second casino, an cashless transaction clearinghouse may be used (see description below) to validate the cashless instrument and automatically send an electronic fund transfer to the first casino. In contrast, to use a casino chip from a first casino at the second casino, many manual processing tasks are required. For instance, the chip is stored in a container at the table game, taken to a back room. In the back room, the chip is identified and then a request for a reimbursement is manually generated and then sent from the first casino to the second casino.

The cashless interface devices 83 and 84 may comprise components used to generate and to redeem cashless instruments at a gaming machine. For example, the cashless interface devices may comprise one or more of the following gaming devices, a bill validator that may be used to read tickets, a bar-code scanner, a card reader for reading magnetic striped cards or smart cards, a key pad, a touch screen interface, a printer, a storage tray for blank tickets, a logic device (e.g., a microprocessor or microcontroller), a power supply, an RFID tag reader, a storage tray for validated tickets and a wired or wireless communication interface for communicating with devices such as a concentrator 85, communicating directly with the cashless server 95 or communicating with a player tracking/accounting server. The one or more gaming devices in the cashless interface devices 83 and 84 may be mounted in a housing.

Returning to FIG. 2B, after the second cashless instrument is generated by one of the cashless interface devices at the table games, the player may take the cashless instrument to a keno station connected to the keno server 89 and use the cash value on the instrument or a portion of the cash value to play a keno game. For example, if the cash value on the second instrument is $100 dollars, after the cashless instrument is validated, a player may purchase $50 worth of keno tickets and receive $50 cash payout for the remaining value of the ticket. In one embodiment, a casino service person carrying a hand-held wireless device may validate the second cashless instrument with the hand-held device and exchange it for keno tickets and cash for any remaining cash value on the instrument. Details of using a hand-held wireless device for redeeming cashless instruments are described in co-pending U.S. application Ser. No. 09/544,884 previously incorporated herein. The hand-held wireless device may also communicate with the keno server 89 to indicate that keno tickets have been issued to the player.

In another embodiment, the player may purchase keno tickets at a keno station connected to the keno server 89. The player may present the second cashless instrument at the station. Information stored on the second cashless instrument may be read into the keno system and sent to the keno server 89. The keno server 89 tracks all of the money going into and out of the keno system. Therefore, when a cashless instrument is validated to play keno, information regarding the portion of the cash value used for keno may be processed and stored by the keno server 89.

The keno server 89 may also receive validation information stored on the cashless instrument. The keno server 89 may send the cashless server 95 a validation request message requesting the validation of the second cashless instrument. The validation request message may include validation information from the second cashless instrument needed by the cashless server 95 to validate the second cashless instrument. Further, the validation request message may include any additional information required for the keno server 89 and the cashless server to communicate in a secure manner 95. Details of secure communication are described in more detail in co-pending U.S. application Ser. No. 09/993,163 previously incorporated herein.

In response to the validation request message, the cashless server 95 attempts to validate the second cashless instrument and may generate a reply message indicating an approval or rejection of the validation of the second cashless instrument. When the validation of the second cashless instrument has been approved, the keno server 95 may send a message to the keno station indicating the validation of the second cashless instrument has been approved. After the second cashless instrument has been exchanged for keno game play and for cash (if there is any remaining cash value not used for keno game play), the keno station may send a message to the keno server indicating the cashless transaction has been completed. The keno server 89 may store a record of the transaction and send a message to the cashless server 95 indicating the transaction has been completed.

After keno game play, the player may have a number of winning tickets from the keno game. In one embodiment, these tickets may be taken to a keno station and cashed out. The keno server 89 may be contacted to determine the winning keno tickets and validate the winning keno tickets. When the tickets are cashed out, a third cashless instrument may be generated with a cash value won from the keno game play. The keno server 89 may generate a message and send it to the cashless server to indicate a new cashless instrument has been generated. The message may include validation information that is stored on the cashless server and the newly generated cashless instrument. The validation information is compared with information read from the newly generated cashless instrument when it is later presented for validation at a validation site.

In one embodiment, prior to generation of the cashless instrument, a generation request message may be sent the cashless server 95 by the keno server to request a generation of a new cashless instrument. When a request is received by the cashless server 95 to generate a new cashless instrument from the keno server 89, the cashless server 95 may generate a reply message including validation information that may be stored on the cashless instrument that is to be generated, such as a unique serial number. The unique serial number may be stored on the new cashless instrument and stored on the cashless server 95. When a validation request for the newly generated cashless instrument is later received by the cashless server 95, the validation information, such as the unique serial number generated and stored on the cashless server 95, may be used for validation purposes.

A third cashless instrument generated as a result of a win at keno play may be taken by the player and presented at a sports book station connected to the sports book server 88. A portion or all of the cash value stored on the third cashless instrument may be used to make a sports wager. The sports book server 88 may process the third cashless instrument like the keno server 89, i.e., sending a validation request message to the cashless server, etc. If the sports wager is a win, a fourth cashless instrument may be generated and processed by the sports book server 88 like the keno server 88. The fourth cashless instrument, as well as the first, second and third cashless instruments previously described, may also be used to make sports wagers, play table games, play gaming machines, play bingo, play keno and any other games that are offered at a casino and the present invention is not limited to the sequence of game play described in the example above.

The cashless server 95 may include a keno interface 87 for communicating with the keno server 89 and a sports book interface 86 for communicating with the sports book. Additional interfaces may be provided for any other independent gaming systems, such as bingo, that communicate with the cashless server 95. The keno server 89 and sports book server 88 may also include a cashless system interface (not shown) that allows them to communicate with their corresponding interface on the cashless server 95. The interfaces may be defined by application program interfaces (API's). The API's may describe information, information formats and commands that may be exchanged by the servers.

In some embodiments of the present invention, it may be advantageous to provide a casino kiosk 90 where cashless instruments may be validated and utilized. The casino kiosk may be an automated menu driven system like an automatic teller machine. For example, in one embodiment at a casino kiosk, a player may be able to validate a cashless instrument and obtain keno tickets or a make a wager. The casino kiosk may be connected to the keno server 89, the sports book server 88 and the cashless server 95 to facilitate these transactions.

Figure 11:
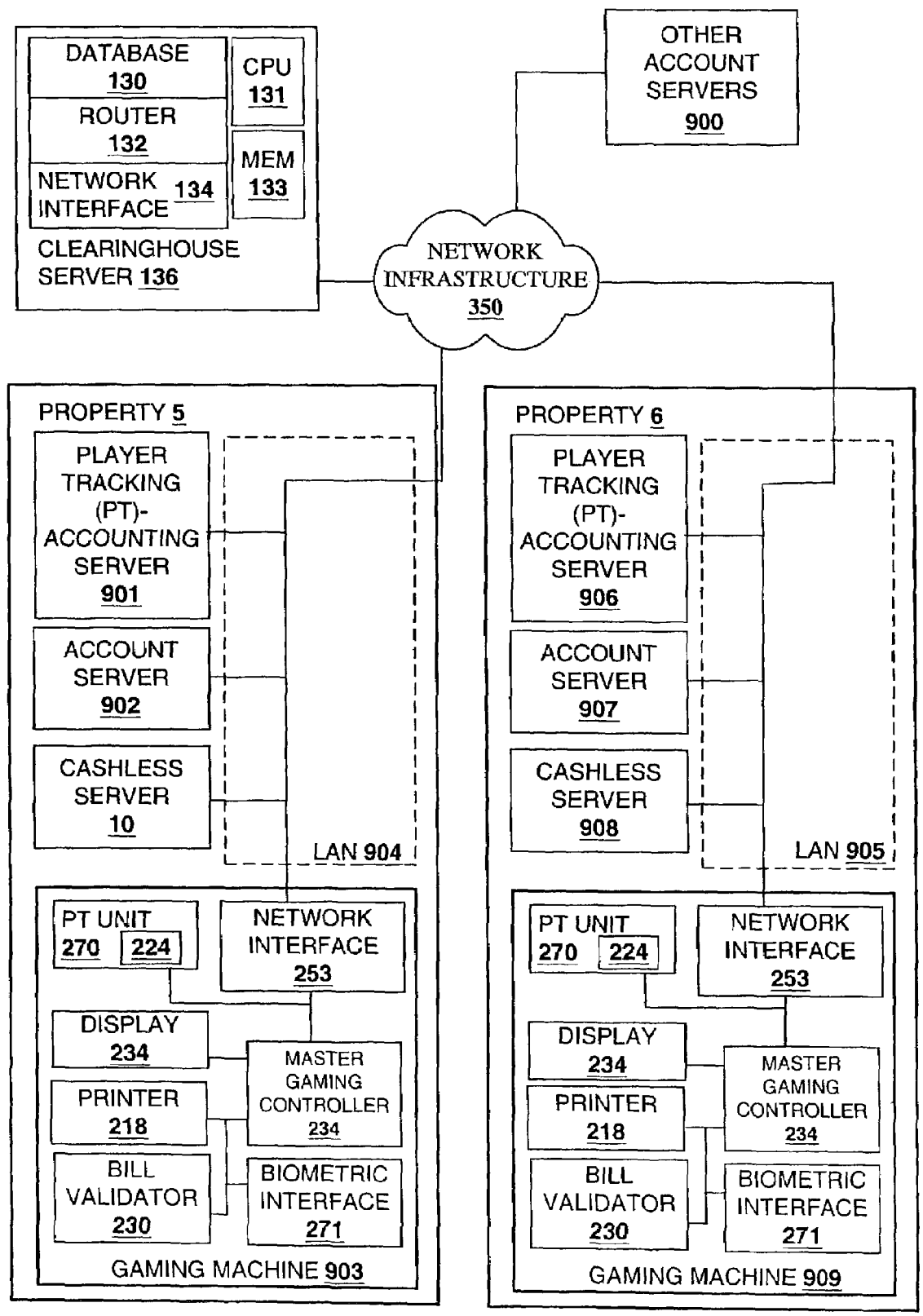
FIG. 11 is a simplified block diagram of a cashless instrument transaction clearinghouse server connected to cashless systems and other account systems at multiple properties.

In another embodiment, the player may wish to partially cash a cashless instrument or transfer a portion of the cashless instrument to a remote account (see FIG. 11). In this case, the cashless instrument may be validated, the player may specify a cash amount they wish to receive and may receive cash for the specified amount (or transfer it an account) and receive a new cashless instrument with the remaining amount not cashed. In yet another embodiment, a player may wish to add cash to a cashless instrument. In this case, the player may input a cashless instrument into the casino kiosk 90 and input additional funds, such as cash or a transfer from another account, then a new cashless instrument with the added finds may be generated and issued to the player. In a further embodiment, a player may wish to combine a plurality of cashless instrument into a single cashless instrument. In this embodiment, the player may present a plurality of cashless instrument to the kiosk 90. The value of the cashless instrument may be added together and a single cashless instrument with the combined value may be generated and presented to the player.

In a particular embodiment, at the casino kiosk 90, a player may be provided transaction opportunities that allow a non-restricted cashless instrument to be converted to a restricted cashless instrument. A non-restricted cashless instrument is non-restricted in that the cash value stored on the cashless instrument may be redeemed for cash or used for game play in an unrestricted manner. For a restricted cashless instrument, the use of a cash value stored on the cashless instrument is restricted in some manner. For example, for a restricted cashless instrument, the cash value may only be spent during certain time periods (e.g., period during the day, the week, holiday periods, etc.), at certain locations (e.g., a particular gaming property or groups of gaming property), on certain games (e.g., a particular game of chance implemented on a gaming machine), for certain activities (e.g., keno, a type of table game). Of course combinations of restrictions may be used and the restrictions are not limited to only these examples, which are provided for illustrative purposes only.

The gaming operator may provide incentives to entice players to convert a non-restricted cashless instrument to a restricted cashless instrument or to purchase a restricted cashless instrument. As an example, the casino may offer to add value to a non-restricted cashless instrument to convert it to a restricted cashless instrument. To illustrate, the casino may offer to add two dollars to the cash value of a non-restricted cashless instrument with a six dollar value if it is converted to a restricted cashless instrument that may be used for game play only (for the game play only restriction, the credits may no longer be redeemed for cash but may only be used to play games). Alternately, a player may be able to purchase cashless instrument with an eight dollar value that is restricted to game play only for six dollars.

In another example, the casino may offer to increase the player tracking points accumulated using a cashless instrument when it is converted from a non-restricted cashless instrument to a restricted cashless instrument. In one embodiment, these types of incentives may be awarded as a "comp"

in a loyalty program, such as a player tracking program. The embodiments described in regards to the casino kiosk 90 are not limited to the casino kiosk. For instance, opportunities to convert a non-restricted cashless instrument to a restricted cashless instrument may be provided at a gaming machine, at the cashless interface devices or other devices in the cashless system.

The ability to use cashless instruments at a plurality of different locations within a gaming establishment at a casino, such as at the table games, gaming machines, sports book and keno parlor, using a common cashless system may be extended to a plurality of gaming properties. For instance, a cashless instrument issued at a gaming machine at first gaming establishment may be used to play keno at a second gaming establishment. Details of a cashless instrument transaction clearinghouse that allow these transactions between multiple properties is described as follows.

Figure 3:
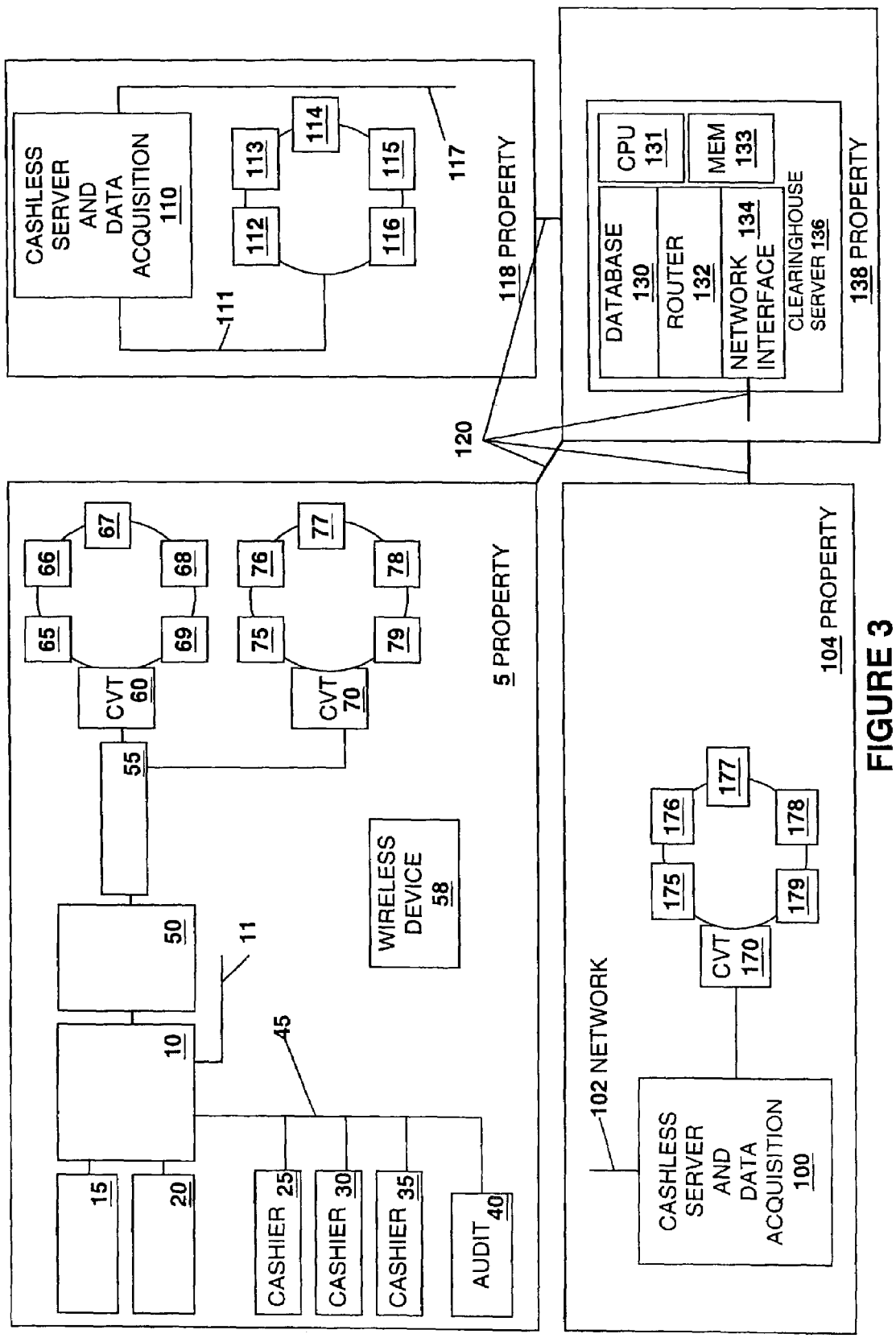
FIG. 3 is a block diagram of cashless systems at multiple properties connected to a cashless instrument transaction clearinghouse server.

FIG. 3 is a block diagram of cashless systems at multiple gaming properties connected to a cashless instrument transaction clearinghouse server. At property 5 (described with reference to FIGS. 2A and 2B), property 104 and property 118, three different embodiments of cashless systems are shown. At property 104, gaming machines 175, 176, 177, 178, 179 send information to the clerk validation terminal 170. The CVT 170 sends information to the cashless server and data acquisition system 100. In this embodiment, the functions of the controller 50 and concentrator 55, as described with reference to FIG. 2, are combined into the cashless server and data acquisition 100. The cashless instrument used on property 104 may be smart cards, magnetic cards, ticket vouchers, combinations of the three or other cashless mediums.

The cashless server 100 contains a communication interface used to send information on cashless instruments generated on property 104 to the clearinghouse server 136 or request information on cashless instruments issued at other properties, including property 5 and property 118, that are being validated at property 104 from the clearinghouse server 136. The cashless instrument transaction information sent to the cashless server 100 from the clearinghouse server 136 and received by the clearing house server from the cashless server 100 is transmitted via the network connection 102. Details of information transmitted between the cashless servers including 10, 100, 110 and the clearinghouse server 136 in regards to multi-property cashless instrument validation are described with reference to FIGS. 4, 5, 6 and 7.

At property 118, gaming machines 112, 113, 114, 115 and 116 are connected to the cashless server and data acquisition system 110 via the local network 111. The local network 111 may be a wireless or wired connection system including fiber, copper or wireless cellular, combinations of all three or other connection systems. A separate CVT is not shown in this embodiment. The functions of the CVT including storage of ticket information may be built into one or more the gaming machines including 112, 113, 114, 115 and 116 or may be built into the cashless server 110. The information sent to the cashless server 100 from the clearinghouse server 136 and received by the clearing house server 136 from the cashless server 100 is transmitted via the network connection 102.

In one embodiment, the clearinghouse server resides on property 138 separate from the other properties, including property 5, property 118 and property 104, containing the cashless servers including 10, 100 and 100. In other embodiments, the clearinghouse server 136 may reside at the same property as one of the cashless servers. Communication between the clearinghouse server 136 and the two or more cashless servers, including cashless servers 10, 100, 110, may be performed via the network connections 120 and the network interface 134 residing within the clearinghouse server 134. The connections between the cashless servers and the clearinghouse server 136 including 11, 102, 117 and 120, may comprise a dedicated communication network.

Components of the cashless instrument transaction clearinghouse server 136 may include 1) a memory storage unit for storing cashless instrument transaction information in a transaction database 130, 2) a functional router 132 enabling communication between the clearinghouse server and different properties, 3) a CPU 131, 4) a memory 133 containing software for implementing the clearinghouse functions and 5) the network interface. The transaction database 130 may contain ongoing and past cashless instrument transactions processed using the clearinghouse server 136. The transaction database 130 may be implemented using Microsoft NT (Microsoft, Redmond, Wash.) and SQL (server query language). The cashless servers, including 10, 100 and 110, may also utilize this database technology.

Cashless instrument transaction information for two or more gaming properties may be stored in the clearinghouse server transaction database 130. The properties may be owned by the same or different entities. The transaction database 130 may be accessed remotely by the properties, including 5, 104, and 118, utilizing the clearinghouse server 136. Further, the transaction database 130 may be used with analysis software to analyze transactions routed through the clearinghouse server 136. An transaction analysis interface is described with reference to FIG. 8.

The transaction database 130 may be partitioned to according to properties or ownership of properties to limit access to the database 130. For example, when property 5, property 104 and property 118 are each owned by different entities, each property may only analyze cashless instrument transactions relating to cashless instruments generated and validated at their own property stored at the clearinghouse server 136. Thus, the owners of property 5 may access information relating to cashless instruments generated at property 5 and validated at properties 104 and 118 using the clearinghouse server 136 and the owners of property 5 may access information relating to cashless instruments generated at properties 104 and 118 validated at property 5. However, the owners of property 5 would not be able to access information in the database regarding cashless instruments generated at property 118 and validated at property 104. When more than one property is owned by a single entity, the single entity may be able to access cashless instrument transaction information relating to ownership of all of the properties owned by the single entity. For instance, when the single entity owns properties 5 and 104, the single entity may access the transaction database 130 for transactions relating to cashless instruments generated at properties 5 and 104 and validated at any of the properties using the clearinghouse server 136. Additionally, the single entity may access the transaction database 130 for transactions relating to cashless instruments generated at any of the properties and validated at properties 5 and 104.

The router 132 may contain routing information that allows the clearinghouse server 136 to determine where a cashless instrument was generated. The routing information is used when a cashless instrument is validated at a property different from the property where it was generated. For example, routing information is needed when a cashless instrument is generated at property 5 but the cashless instrument is validated at property 104. Each cashless instrument may be generated with a unique property identifier stored within the cashless instrument. When a validation request for the cashless instrument is received by the clearinghouse server, a property routing table stored within the router may be used by the server to determine where the cashless instrument was generated and communication information allowing the clearinghouse server 136 to communicate with the cashless server where the cashless instrument was generated.

The requirements associated with accounting and reporting of the cashless instrument information are dependent on the regulations within the jurisdiction. That being the case, the system is adaptable to those particular regulations. In general, a cashless instrument with an award amount may be considered to be analogous to a personal check written by the property where it was generated. When the cashless instrument is validated, it is essentially cashed. This implies that the property where the cashless instrument was generated must maintain a database of data related to those cashless instruments that were created on its property. This is analogous to maintaining a bank account whose sole purpose is to cover the cashless instruments that were generated at the property. This property is usually responsible for maintaining its cashless instrument database and validating cashless instruments. When a request to validate a cashless instrument is received by the cashless system at a particular gaming property, the property has the option of validating or rejecting the request. Once the property validates the cashless instrument, it is typically the responsibility of that property to insure its own cashless instrument transaction database is updated. At that time, the property which generated the cashless instrument, now must transfer the funds to the property requesting the validation. The fund transfers may occur with each transaction or could be compiled in a batch to cover multiple ticket validation transactions on a periodic basis, eg. once a night. The cashless instrument transaction clearinghouse facilitates all associated electronic fund transfers (EFTs) and acts as a third party between the parties. Details of these transactions are described with reference to FIGS. 4, 5, 6 and 7.

Figure 4:
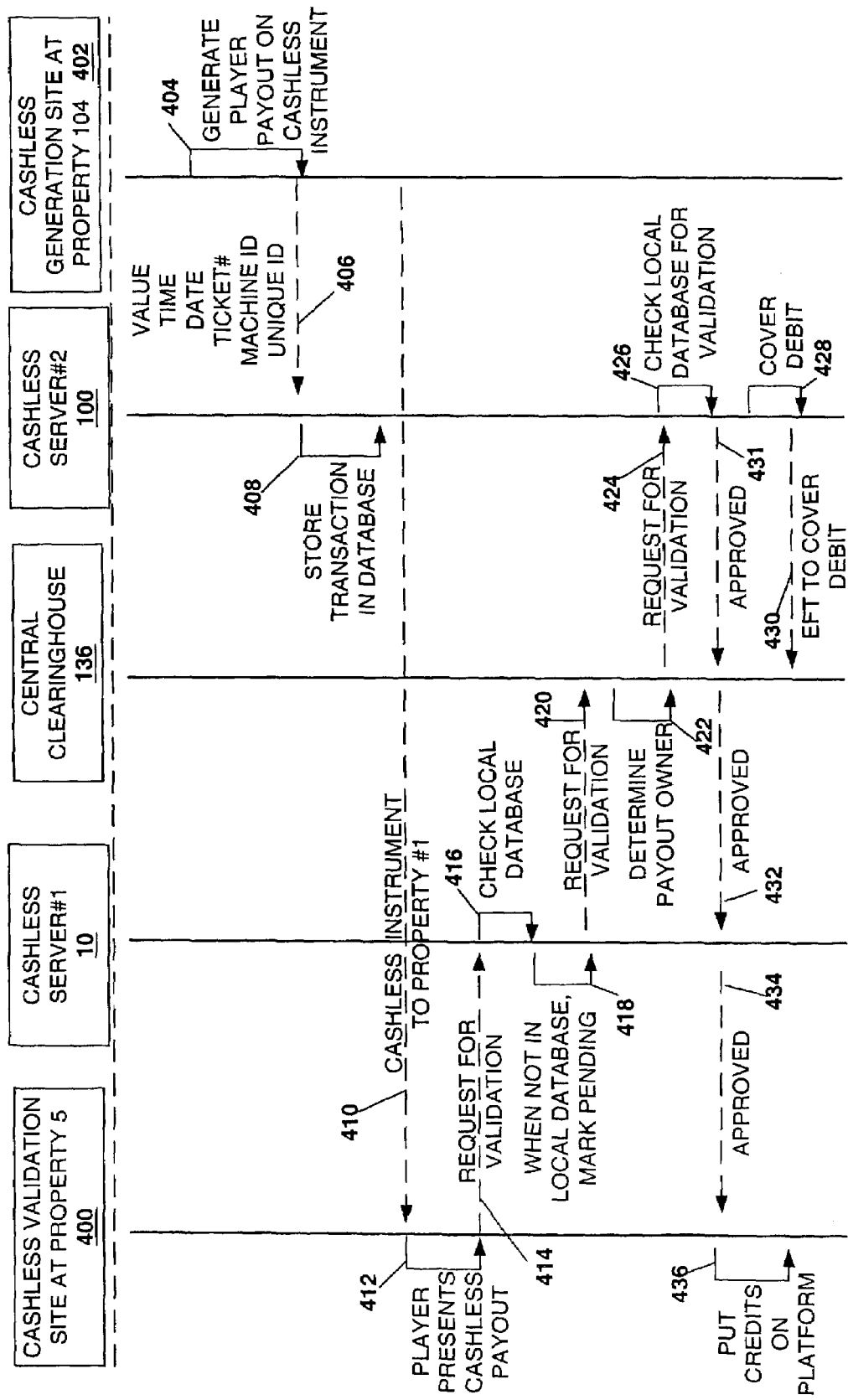
FIG. 4 is an interaction diagram for a cashless instrument transaction between a clearinghouse, cashless servers, and cashless generators/validators where the cashless instrument is generated at a different location from where it is validated.

FIG. 4 is an interaction diagram for a cashless instrument transaction between a clearinghouse, cashless servers, and cashless generators/validators where the cashless instrument is generated at a different location from where it is validated. In 404, a player payout (e.g. award) is generated on a cashless instrument at a cashless instrument generation site 402 at property 100. The cashless instrument generation site may include a gaming machine, a clerk validation terminal, a wireless validation terminal and a cashier station. The cashless instrument may include a printed ticket voucher (e.g. EZ pay ticket), a smart card, a debit card and other cashless mediums. In 406, when the cashless instrument is generated, cashless instrument transaction information, including 1) a value, 2) an issue date, 3) an issue time, 4) a transaction number unique to the transaction, 5) a machine ID that generated the cashless instrument, 6) an issue location and 7) an owner, may be transmitted to the cashless server 100. The cashless instrument transaction information is also stored on the cashless instrument when the cashless instrument is generated in 404. In 408, the cashless server may store the cashless instrument transaction information in a database. The transaction information stored in the database is used when the cashless instrument is validated. The validation process may be invoked when the cashless instrument is redeemed for cash or when the cashless instrument is used in a gaming machine or other device that accepts the cashless instrument. The validation process involves comparing the cashless instrument transaction information stored on the cashless instrument with the cashless instrument transaction information stored in the cashless server database.

In 410, a game player takes the cashless instrument generated at property 100 to property 5. In 412, the game player presents the cashless instrument for a cashless payout at a cashless transaction validation site 400 at property 5. The cashless transaction validation site may include a gaming machine, a cashier station, a clerk validation terminal, a wireless validation device and any other devices which accept cashless instruments. For instance, when a debit card is used as the cashless instrument, the game player may be able to directly deposit the award on the debit card into a bank account accessible to the game player. In 414, a validation request is sent from the cashless transaction validation site 400 to the cashless server 10. The validation request may be an information packet containing the transaction information stored on the cashless instrument in 404 and stored in the cashless server database in 408.

In 416, the cashless server may check the local cashless instrument transaction database on the cashless server to determine if the cashless instrument was generated at property 5. The cashless server may check the local cashless instrument transaction database in a number of ways to determine whether a transaction record for the cashless instrument resides in the database. The database search technique may depend on what information is stored in the local database and what information is stored on the cashless instrument. When the cashless instrument was generated at a property using a different cashless system than the property where the cashless instrument is validated, the type and amount of cashless instrument transaction information stored on the cashless instrument may differ from the type and amount of cashless instrument transaction information stored on the local cashless instrument transaction instrument database. Thus, the search technique may depend on determining a common set of transaction information stored on the cashless instrument being validated and stored in the cashless instrument transaction database. For instance, when the cashless instrument contains a machine ID and the cashless instrument transaction database stores a list of all of the local machine IDs, the cashless server 10 may search the local cashless instrument transaction database to determine whether the cashless instrument was generated on one of the local machines at the property 5. As another example, when the cashless instrument contains transaction information on the property where the cashless instrument was generated or the owner of the cashless instrument (e.g. the owner of the property), the cashless server 10 may quickly determine whether the cashless instrument was generated at the local property 5.

In 418, when the cashless instrument was not generated locally, the cashless server may mark the validation request pending in a local database and send a request for validation to the central clearinghouse in 420. The request for validation from the cashless server 10 to the cashless instrument transaction clearinghouse 136 may contain all or some subset of the information stored on the cashless instrument being validated. In addition, the request for validation may contain information about the cashless transaction validation site. For example, the identification information about the cashless transaction validation site 400, the property 5 where the cashless transaction validation site is being validated and the owner of the property may be included in the request for validation message.

As in 414, the request for validation in 420 may be an information packet of some type sent using a pre-determined communication protocol between the cashless server 10 and the central clearinghouse 136. The communication protocol used to transmit transaction information between the cashless transaction validation site 400 and the cashless server 10 in 414 may be the same or different than the communication protocol used to transmit the transaction information between the cashless server 10 and the cashless instrument transaction clearinghouse 136 in 420.

In 422, the cashless instrument transaction clearinghouse determines the owner of the cashless instrument (e.g. the property where the cashless instrument was generated). The clearinghouse 136 determines the owner based upon information received in the validation request in 420 and based upon information stored in the clearinghouse 136. In 424, using routing information stored within the clearinghouse 136, a request for validation is sent from the clearinghouse 136 to the property where the cashless instrument was generated (i.e. property 104 in this embodiment). The request for validation is an information packet in a communication protocol of some type. The transaction information contained within the information packet is sufficient to allow the cashless server 100 at the cashless generation site 402 at property 104 to validate the cashless instrument. The communication protocol used to transmit the transaction information between the cashless server 10 and the clearinghouse 136 in 420 may be the same or different than the communication protocol used to transmit the transaction information between the cashless instrument transaction clearinghouse 136 and the cashless server 100 in 424. For example, the communication protocols may be different when the cashless system used at property 5 is different from the cashless system used at property 104.

In 426, the cashless server 100 checks the local cashless instrument transaction database to confirm the request for validation received in 424 is valid. When the transaction is valid (e.g. the cashless instrument was generated at property 104 and has not been previously validated), in 431, an approval message may be sent from the cashless server 100 to the clearinghouse 136, in 432, the clearinghouse may forward or generate the approval message to the cashless sever 10, in 434, the cashless server 10 may forward or generate the approval message to the cashless transaction validation site 400. In 428, the cashless server may cover the debit by allocating or transferring funds to an account used to cover debits. In 430, the cashless server 100 may send an Electronic Fund Transfer (EFT) to cover the debit to the clearinghouse 136. The EFT may be sent after each transfer or may be sent as a batch at the end of some time period, e.g. at the end of each day.

In 436, the validation site 400 at property 5, performs an appropriate operation when the validation is approved. For example, when the validation site 400 is a gaming machine, credits may be posted on the gaming machine. As another example, when the validation site 400 is a cashier station, the player may receive a cash amount according to the value of the cashless instrument.

One advantage of using a cashless system with EFT is that nothing physical has to be exchanged between the properties. When a token is issued as a credit of indicia at one property and then used at a second property, the second property may allow the token to be used as credit of indicia at the second property. However, the tokens must be counted at the second property and then shipped back to the first property and counted so that the second property may receive the amount of money associated with the token. For many properties accepting tokens from many different properties, the infrastructure associated with the counting, sorting and shipping of tokens from one property to another may be quite large. This type of infrastructure may be reduced or eliminated using the cashless instrument transaction clearinghouse with EFT between various properties connected to the clearinghouse.

Besides cashless instrument validations for payout, in another embodiment, the cashless validation processes described above using the cashless instrument transaction clearinghouse may be used to run promotions or complimentary promotions across multiple properties. For example, a promotion could be targeted for a specific type of gaming machine or game theme whereby the player would receive a cashless instrument such as a bar coded ticket from the gaming machine during game play. This bar coded ticket could be redeemed at any of the participating properties linked by the cashless instrument transaction clearinghouse. The bar coded ticket may be redeemed for merchandise or game play credit—whichever is defined as the promotion and printed on the ticket. Further, the ticket may be generated by the gaming machine to entice the player to redeem the ticket at a specific property connected to the cashless instrument transaction clearinghouse. As described above, ticket validation is performed at the gaming property to verify that the ticket is a valid promotional or complimentary ticket. Rather then being limited to a single property, the cashless instrument transaction clearinghouse manages the promotions across the properties and maintains a centralized database containing the promotion theme parameters and the statistics once the game has begun.

In another embodiment, the cashless validation processes described above using the cashless instrument transaction clearinghouse may be used to run multiple progressive games associated with the generation or validation cashless instruments at the gaming machine, each of which is managed and controlled by cashless instrument transaction clearinghouse. These new types of progressive games are associated with either the redemption/validation of a cashless instrument or the generation of a cashless instrument upon cashout. At the time a cashless instrument is inserted into a gaming machine for validation by the system, an event gets transmitted to the cashless instrument transaction clearinghouse whereby the player validating the ticket or other cashless instrument has a chance to win a jackpot. A player may also win a jackpot when a cashless instrument is generated. These jackpot events may be incorporated as part of the cashless instrument generation and validation process as described above with reference to FIG. 4 and as described below with reference to FIGS. 5, 6 and 7.

Similar to a lotto game where a sequence of numbers is used to match a central sequence of numbers in an attempt to win the lotto grand prize, the cashless instrument transaction clearinghouse randomly selects a sequence of numbers which is compared to the transaction validation number stored on the cashless instrument. When these two sequence of numbers match, the player wins the central jackpot and is notified of the win at the gaming machine or the cashless transaction validation site where the cashless instrument is being redeemed. Notification to the player may be made in a number of ways including 1) on the gaming machine's video screen 2) by generating a ticket or other cashless instrument at the gaming machine or other cashless transaction validation site indicating the player has won the jackpot.

The jackpot can be funded in many different ways including, but not limited to: 1) a small percentage of each ticket is held by cashless instrument transaction clearinghouse, e.g. 5 cents of each ticket inserted or cashed out is paid to the cashless instrument transaction clearinghouse for a chance to win the progressive jackpot, 2) each property connected to the cashless instrument transaction clearinghouse pays a small amount (cents) into the progressive jackpot each time the player cashes out or redeems a ticket. In addition, the player may have the option at the gaming machine to play for the progressive jackpot upon cashless instrument generation and cashless instrument validation. Thus, the player may chose to commit a small percentage of the cashless instrument towards winning the jackpot which funds the jackpot.

In general, there may be more then one such progressive jackpot managed by the cashless instrument transaction clearinghouse. With multiple progressive jackpots managed by the clearinghouse, each property may have a small progressive for matching a few numbers in addition to a larger progressive across all properties when all numbers on the ticket are matched. The multiple progressive jackpots may provide more chances for a player to win a jackpot. In addition progressive jackpots may encourage the use of cashless instruments by the game player which as mentioned above many operational advantages to the properties using cashless systems.

Figure 5:
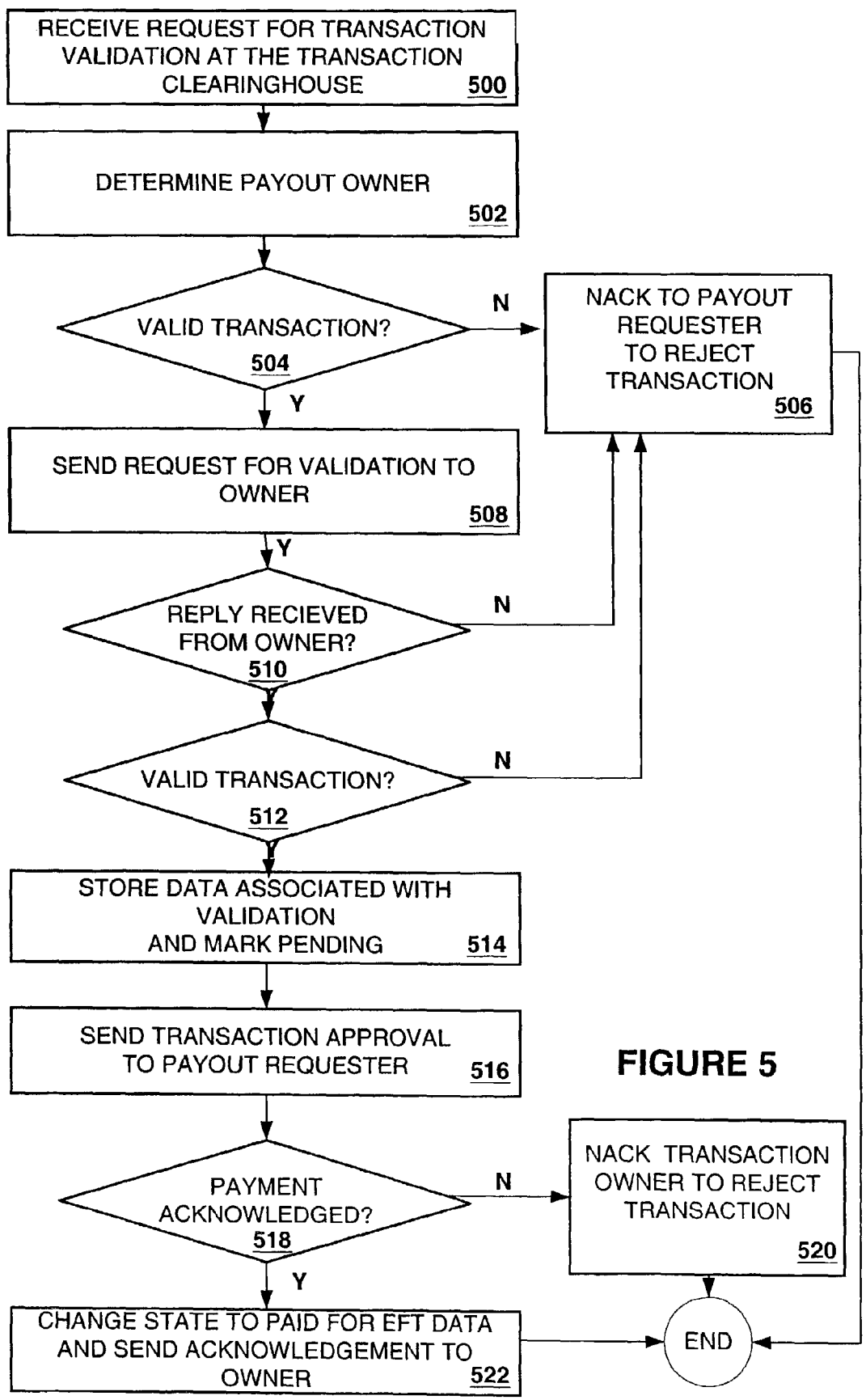
FIG. 5 is a flow chart depicting a method of validating a cashless instrument transaction at a cashless instrument transaction clearinghouse.

FIG. 5 is a flow chart depicting a method of validating a cashless instrument transaction at a cashless instrument transaction clearinghouse. One context of the method of validating the cashless instrument transaction at the cashless instrument transaction clearinghouse is described with respect to FIG. 4. In 500, a request for a cashless instrument transaction validation is received at the clearinghouse 500 from a cashless server. In 502, using information received in the transaction validation request, the clearinghouse determines the transaction owner described in the transaction validation request. In 504, the clearinghouse may determine the validity of the transaction. A transaction may be invalid for a number of reasons including 1) the transaction owner is unknown, 2) the transaction is pending and 3) the transaction has previously been validated. In 506, when the transaction is not valid, a transaction validation reply containing a Non-Acknowledgement (NACK) is sent to the transaction requester of the transaction validation request. The NACK indicates to the transaction requester that the transaction can not be validated at the present time.

In 508, a validation request for the transaction is sent to the cashless server which is the cashless instrument transaction owner determined in 502. In 510, when a validation reply to the validation request is not received by the clearinghouse from the cashless instrument transaction owner, in 506, a transaction validation reply with a NACK is sent to the transaction validation requester. In 512, when a validation reply is received from the cashless instrument transaction owner, the clearinghouse determines whether the validation transaction has been approved or rejected by the cashless instrument transaction owner. A transaction may be rejected for a number of reasons including 1) the cashless instrument has already been validated (e.g. paid), 2) a record of the cashless instrument can not be found and 3) a cashless instrument with transaction information matching the validation request is currently pending. In step 506, when a transaction is rejected, a transaction validation reply with a NACK may be sent to the transaction validation requester.

In 514, when the transaction has been approved by the cashless instrument transaction owner, data associated with the transaction is stored in the clearinghouse database and the transaction is marked pending. While the transaction is pending, the clearinghouse may reject (i.e. 506) validation requests for cashless instruments with transaction information identical to the pending transaction validation request. This operation may be implemented to prevent fraud. In 516, a transaction validation reply with information indicating the requested transaction has been validated is sent from the clearinghouse to transaction validation requester which may be a cashless server. In 518, when the payment of the transaction by the transaction validation requester is not acknowledged in a message of some type, a message containing a NACK may be sent to cashless instrument transaction owner in 520. In 522, when the payment by the transaction validation requester is acknowledged, the state of the transaction is changed from pending to paid and a message may be sent to the owner of the transaction indicating the transaction has been paid. Transaction information stored by the clearinghouse may be used to insure an EFT is made from cashless instrument transaction owner to the cashless instrument transaction validator.

Figure 6:
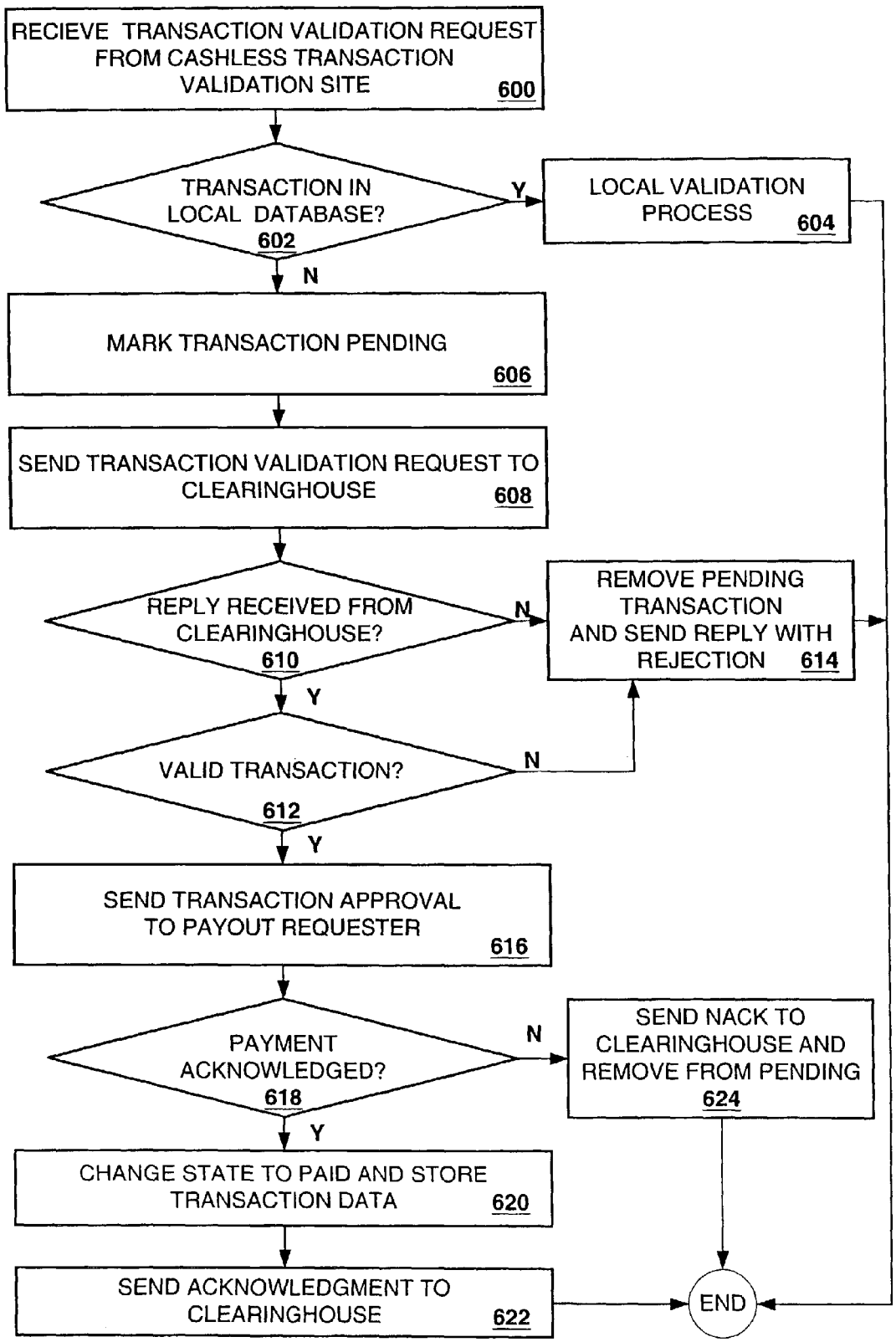
FIG. 6 is a flow chart depicting a method of validating a non-locally owned cashless instrument at a cashless transaction validation site local to the cashless server.

FIG. 6 is a flow chart depicting a method of validating a non-locally owned cashless instrument at a cashless transaction validation site local to the cashless server. One context of the method of validating the non-local cashless instrument transaction at the cashless server is described with respect to FIG. 4. In 600, the cashless server receives a cashless instrument validation request from a cashless transaction validation site. In 602, the cashless server determines the owner of the cashless instrument. When the cashless instrument is locally owned, e.g., the cashless instrument is being validated at the same property where the cashless instrument was generated, a local transaction validation process is used in step 604. One example of a local transaction validation process with respect to a cashless system was described with reference to the EZ pay system in FIG. 1.

In 606, when the cashless instrument transaction owner is non-local, the transaction is marked pending in the cashless server database. In 608, a transaction validation request message containing the cashless instrument transaction information needed to validate the cashless instrument validation request is generated and sent to the cashless instrument transaction clearinghouse. In 610, when a transaction validation reply is not received from the clearinghouse, in 614, the transaction validation request is removed from the queue of pending transaction validation requests, a message containing a transaction rejection is generated and the message rejecting the transaction is sent to the transaction validation site. When a transaction validation reply is received from the clearinghouse, the transaction validation reply typically will contain information regarding whether the requested transaction has been approved or rejected. In 612, when the transaction is rejected, in 614, the transaction validation request is removed from the queue of pending transaction validation requests, a message containing a transaction rejection is generated and the message rejecting the transaction is sent to the transaction validation site.

In 616, when the transaction validation reply approving the transaction validation request is received by the cashless server from the clearinghouse, a transaction approval message may be sent to the cashless transaction validation site that requested the transaction validation in 600. When the execution of the transaction is not acknowledged by the cashless transaction validation site, in 624, the cashless server sends a message to the clearinghouse indicating the transaction has been cancelled and removes the transaction from its queue of pending transactions. In 618, the payment may not be acknowledged for a number of reasons including 1) a communication failure between the cashless transaction validation site and the cashless server, 2) an equipment failure and 3) an operator of the cashless transaction validation site rejects the transaction for some reason. In 620, when the cashless server has received an acknowledgement message from the cashless transaction validation site indicating the cashless instrument transaction has been completed, the state of the transaction is changed from pending to completed (e.g. paid) and information regarding the cashless instrument transaction is stored. In 622, an acknowledgement message indicating the transaction has been completed may be sent to the clearinghouse.

Figure 7:
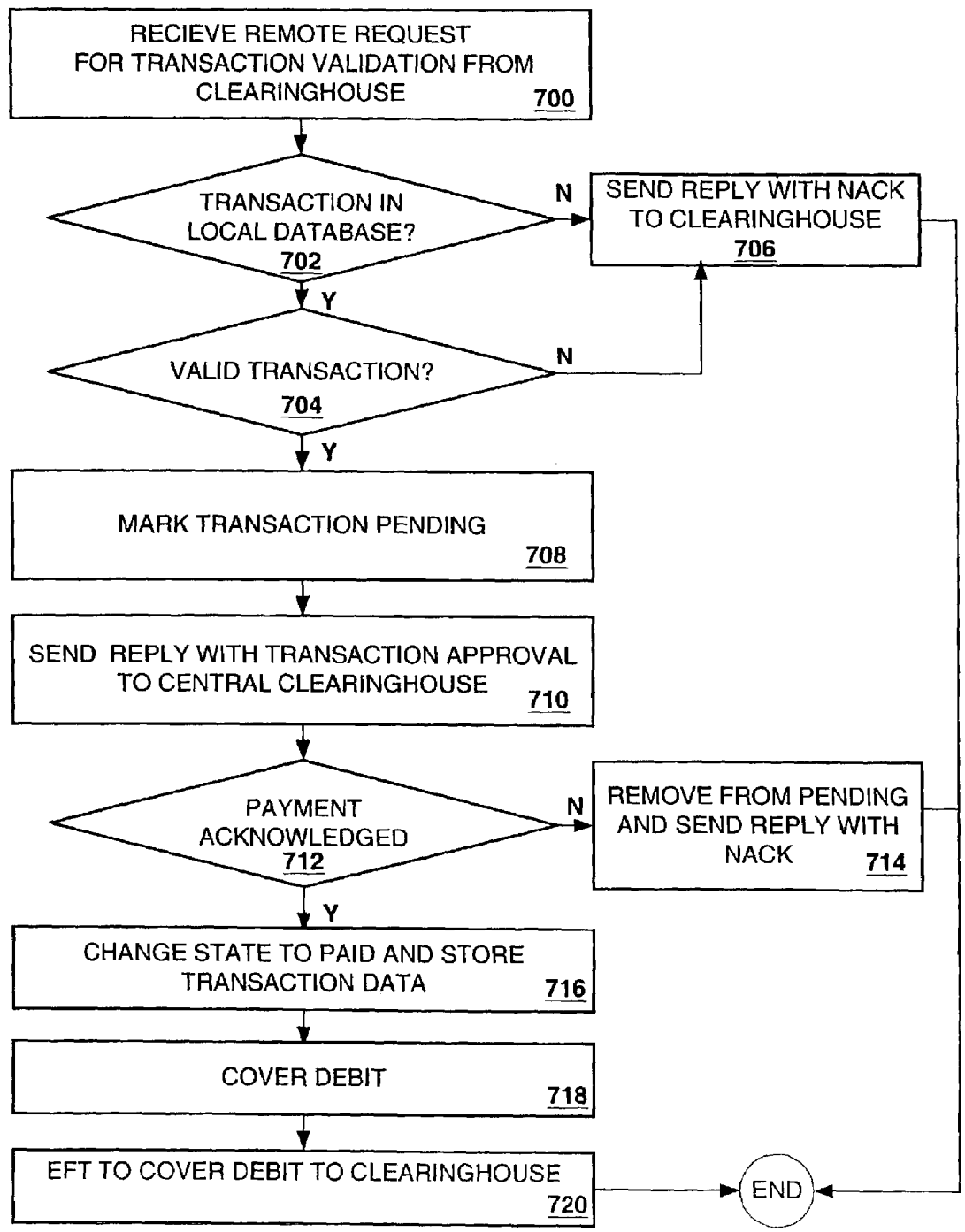
FIG. 7 is a flow chart depicting a method of validating a cashless instrument at a cashless transaction validation site non-local to the cashless server containing a record of the cashless instrument.

FIG. 7 is a flow chart depicting a method of validating a cashless instrument at a cashless transaction validation site non-local to the cashless server containing a record of the cashless instrument. One context of the method of validating a cashless instrument at a cashless transaction validation site non-local to the cashless server containing a record of the cashless instrument is described with respect to FIG. 4. In 700, the cashless server containing the record of the cashless instrument receives a transaction validation request from the cashless instrument transaction clearinghouse. The transaction validation request from the cashless instrument transaction clearinghouse is an information packet that may contain the information needed for the cashless server to validate the transaction.

In 702, using the information contained in the information packet, the cashless server determines whether the transaction has been stored in a database accessible to the cashless server. In 706, when the transaction does not reside in the local database, a non-acknowledgement message indicating the transaction has been rejected is sent to the clearinghouse. In 704, when the transaction resides in the database accessible to the cashless server, the cashless server rejects or approves the transaction. The cashless server may reject a transaction for a number of reasons including 1) the transaction has already been paid and 2) the transaction has been marked pending. When the transaction is rejected, a non-acknowledgement message indicating the transaction has been rejected is sent to the clearinghouse.

In 708, when the transaction has been approved, the cashless server marks the transaction pending in the local database. In 710, the cashless server generates and sends a message to the central clearinghouse where information contained in the message indicates the transaction has been approved. In 712, the cashless server determines whether the payment has been acknowledged. The cashless server may receive an acknowledgement of payment via an acknowledgement message sent by the cashless instrument transaction clearinghouse. Typically, the cashless server may expect an acknowledgement during a fixed period of time. In 714, when the payment of the transaction is not acknowledged by the clearinghouse, the cashless server may remove the pending status of the transaction and send a message to the clearinghouse indicating the transaction is no longer approved.

In 716, when the transaction is approved, the cashless server changes the state of the transaction to paid and stores the transaction data. In 718, as described with reference to FIG. 4, the cashless server covers the debit. In 720, the cashless server may send an EFT to cover the debit, represented by the paid transaction, to the cashless instrument transaction clearinghouse.

Figure 8:
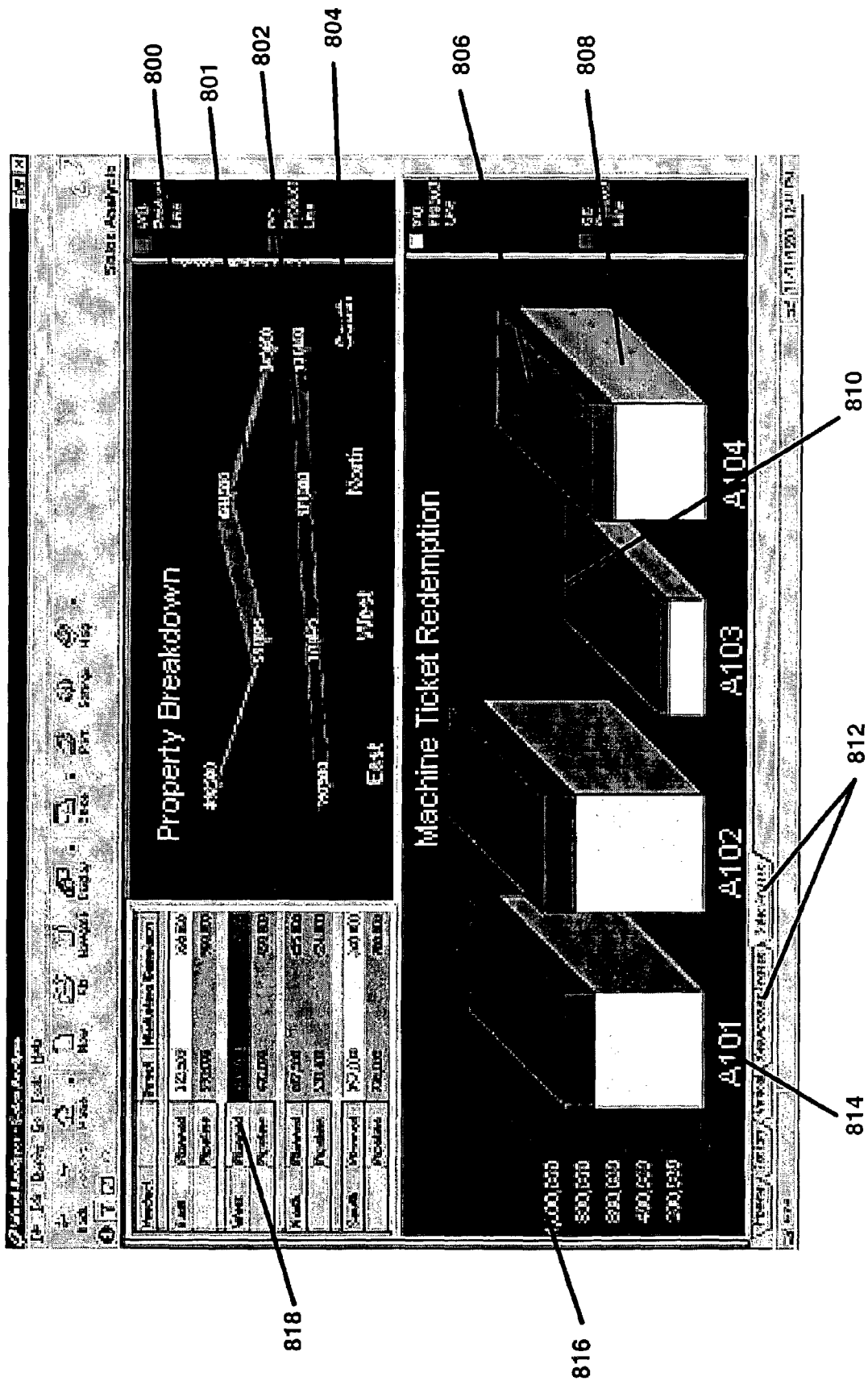
FIG. 8 is a screen shot of a graphical user interface used to analyze cashless instrument transactions in accordance with this invention.

FIG. 8 is a screen shot of a transaction analysis graphical user interface used to analyze cashless instrument transactions that have been processed by a cashless instrument transaction clearinghouse. The transaction analysis graphical user interface (GUI) may provide statistical monitoring for multiple properties connected to the cashless instrument central clearinghouse. With transaction analysis GUI, a user may be able to tract many types of transactions passing through the clearinghouse including 1) transactions relating bar-coded tickets, debit cards and smart cards for cashouts and 2) transactions relating to on-going promotions and compensations (comps) distributed to players. The screen shot is divided into three graphical windows 800, 810 and 818. Each window may contain different visual presentations of data including but not limited to 1) tickets generated, 2) tickets redeemed, 3) flow of tickets from generation to redemption, 4) length of time a ticket is held by a customer, 5) comparison between properties of all ticket statistical data, 6) tickets generated over time by machine, and 7) tickets redeemed overt time by machine (e.g. gaming machine, cashier station, etc.)

In window 800, a breakdown of ticket data for two product lines, including 801 and 802, is plotted for four different properties 804 named North, South, East and West. As mentioned above, access to this information may be limited according to ownership of the properties. In window 818, the numerical values of the data for each property that are graphed in window 800 are displayed as raw data. In window 810, the amount of cashless redemption's for four different gaming machines, including 814, are plotted. The cashless redemption's are broken down according to two different product lines 806 and 808. The values of these product lines were plotted according to property in window 800.

The type of data displayed, the format of the data displayed and the format of the transaction analysis GUT may be easily changed by using the pull downs menus 812 to alternate between graphical displays. In general, all of the statistical information is displayed as raw data, as two dimensional graphs and as three dimensional contour types of graphs representative of ticket transactions or game play. Basic features utilized in the graphical presentation include: titles, X and Y axes scales, data point plotting, shading, horizontal and vertical grid lines, informational messages and data line differentiation.

An advantage of providing a multidimensional view of providing a multidimensional view of multiple property ticket, machine and player related data is that it provides a solid foundation for analytical processing through flexible access to the information of interest to an entertainment corporation operating a number of properties. Operators can visually analyze data across any dimension, at many levels of aggregation, with equal functionality and easy access. The graphical tools provided by the cashless instrument transaction clearinghouse provide views of data in a natural and responsive fashion, which is intended to insulate users from complex database query syntax.

In the previous figures, methods and apparatus were described that enable the validation of cashless instruments at a gaming property different from where the cashless instrument was generated using a cashless instrument transaction clearinghouse. In FIGS. 9-15, methods and apparatus are described for the clearinghouse that allow 1) a transfer of resources from an account at a first gaming property to an account or device at a second gaming property (FIGS. 9, 11, 13A and 13B), 2) account information access (FIGS. 9, 11, 13A and 13B), 3) generation of cashless transaction threads comprising a plurality of related cashless transaction (FIGS. 9 and 10), 4) promotions and services based upon properties of a cashless transaction thread (FIGS. 9, 10, 11, 12, 14 and 15) and 5) local resource accounts maintained at the clearinghouse (FIGS. 9, 11, 13A and 13B).

Figure 9:
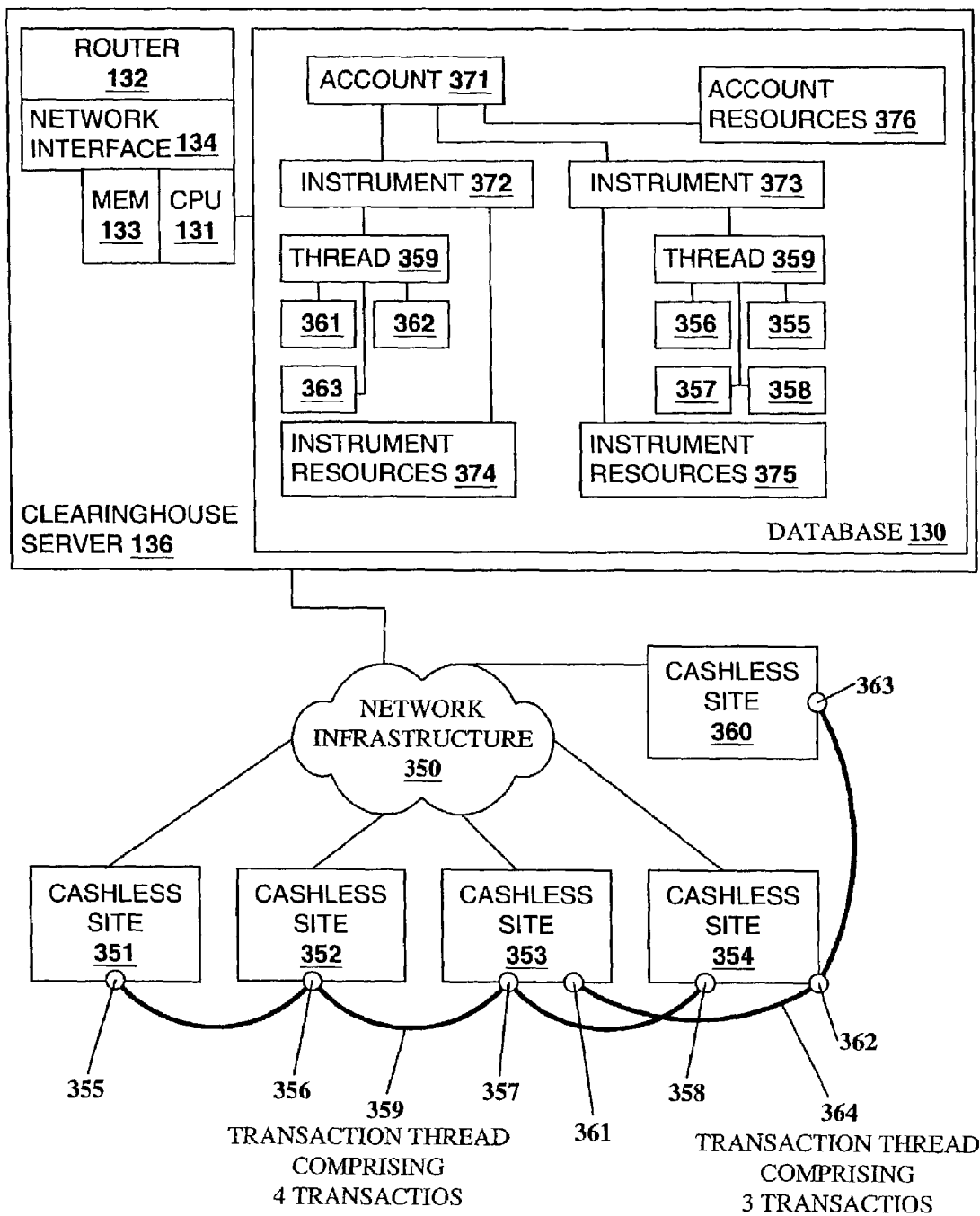
FIG. 9 is a simplified block diagram of a cashless instrument transaction clearinghouse server connected to a plurality of cashless sites.

FIG. 9 is a simplified block diagram of a cashless instrument transaction clearinghouse server 136 connected to a plurality of cashless sites. In FIG. 9, methods and apparatus for providing 1) promotions based upon the properties of a plurality of cashless transactions, 2) accounts, account information, resource access and resources transfers at a cashless instrument transaction clearinghouse are described. For illustrative purposes only, as the present invention is not limited to the architecture shown in FIG. 9, five cashless sites are shown connected to a clearinghouse server 136.

The cashless sites 351, 352, 353, 354 and 360 are connected via network infrastructure 350 to the clearinghouse server 136. The network infrastructure may include local area networks, such as those located within a casino and wide area networks used to connect remote gaming properties to the clearinghouse server. Some examples of possible network architectures that may be used in the present invention are described with respect to FIGS. 2 and 3. The cashless sites, 351, 352, 353, 354 and 360 may be gaming devices, such as gaming machines, that validate or generate cashless instruments as described with respect to FIG. 4. The cashless sites, 351, 352, 354 and 360 may be located one of more different gaming properties. For instance, each of the cashless sites may be located at a different gaming property or as another example, cashless sites 351 and 352, may be located at a first gaming property, cashless site, 353 and 354, may be located at a second gaming property and cashless site 360 may be located at a third gaming property. The gaming properties may have the same or different owners.

A plurality of cashless transactions may be related by information generated during the cashless transactions. A group of related cashless transactions is referred to as a cashless transaction thread. Cashless transaction threads may be generated by the clearinghouse server 136 as it processes various cashless transactions.

In addition, remote servers and gaming devices that process cashless transactions may communicate cashless transaction information to the server 136 for incorporation in cashless transaction threads generated by the server. This information may be sent to the clearinghouse even when the clearinghouse is not needed for validation of the cashless transaction. For instance, when a cashless transaction is validated locally, such as for a validation of a cashless instrument that is generated and redeemed at the same gaming property (as described with respect to FIG. 2), information regarding the cashless transaction may be sent to the cashless instrument transaction clearinghouse server 136 for use in generating cashless transaction threads even though the clearinghouse server 136 may not be required to validate the cashless transaction. Thus, the cashless instrument transactions comprising the cashless instrument thread may be one of i) cashless instrument transactions validated at the clearinghouse 136, ii) cashless instrument transactions validated at one or more gaming properties in communication with the clearinghouse and iii) combinations thereof.

Once a cashless instrument thread is generated, the clearinghouse server 136 may be designed to generate a promotion in response to properties of the cashless transaction thread matching one or more promotion theme parameters. For instance, a property of the cashless instrument thread, such as 359 and 364, may be a total amount spent on game play for the cashless instrument transactions comprising the cashless instrument thread and a promotional theme parameter may be a threshold amount spent on game play. Thus, once the total amount spent on game play in the cashless transaction thread exceeds the threshold amount spent on game play, the clearinghouse may generate a promotion. The promotion may include but is not limited an offer of: i) promotional credits for game play, ii) a discount coupon for merchandise and/or services, iii) a prize (i.e., comp), such as, food, drink, merchandise or a service, iv) a cash award and v) combinations thereof. The promotional credits may be non-cashable credits for game play on a gaming machine.

Next, the generation of cashless transaction threads are described in more detail. A relationship used to generate a cashless transaction thread is referred to as cashless thread criteria. One or more thread criteria may be used to generate a cashless transaction thread. Some examples thread criteria used to relate cashless transactions to generate a cashless transaction thread are as follows: a) a property where the cashless instrument transaction is generated, c) a time when the cashless instrument transaction is generated, d) a value of the cashless instrument transaction, f) a characteristic of a gaming device used in the cashless instrument transaction, g) a type of game played on a gaming machine where the gaming machine is used in the cashless instrument transaction, i) an individual user, j) a group of individual users, k) a group of properties where the cashless instrument transactions are generated, l) a cashless instrument used in the cashless instrument transaction, m) a group of cashless instruments used in the cashless instrument transaction and n) combinations thereof.

For illustrative purposes, two cashless transaction threads, 359 and 364, are shown in FIG. 9. Further details of cashless transaction thread generation are also described with respect to FIG. 10. The cashless transaction thread 359 comprises four cashless transactions, 355, 356, 357 and 358 performed at cashless sites, 351, 352, 353 and 354, respectively. Cashless transaction thread 364 comprises three cashless transactions, 361, 362 and 363 performed at cashless sites 353, 354 and 360 respectively.

A few examples of thread criterion that could be used to relate cashless transactions in threads 359 and 364 are now described. However, the present invention is not limited to these examples. In one embodiment, the cashless transactions, 351, 352, 353 and 354 in the thread 359 can be related by identification information corresponding to a single user. Thus, when cashless sites, 351, 352, 353 and 354 are gaming machines, a single user may use a cashless instrument to participate in game play at each of the gaming machines over time, 351, 352, 353 and 354. Therefore, for instance, the user may first play a game at gaming machine 351 where credits are deposited on the gaming machine and/or redeemed using a cashless instrument where the cashless transaction is validated by the clearinghouse 136. Then, the user may successively proceed to gaming machines 352, 353 and 354 and engage in additional cashless transactions at each of these sites where the cashless transactions are validated by the clearinghouse 136. Thus, the cashless transaction thread may start with a single transaction 355 and then grow to two, three and four transactions over time as the single user continues to play. In general, the properties of cashless transaction threads may change over time.

When the cashless transaction thread is first generated and each time a new cashless transaction is added to the thread or the properties of the thread change, the clearinghouse server 136 may compare the properties of the cashless transaction thread 359 against one or more promotional theme parameters to see if a promotion has been triggered. The promotional theme parameters may change with time and a change in promotional theme parameters may also trigger a comparison between the cashless thread properties and the promotional theme parameters. After the promotional theme parameters have changed, a comparison may be made to the thread properties even if a new transaction has not been added to the thread.

As an example, after each cashless transaction 355, 356, 357 and 358, the properties of the cashless transaction thread 359, such as the total amount spent on game play, may change as a function of time as more cashless transactions are added to the thread. Thus, the server 136, may determine the properties of the thread after each cashless transaction and compare the properties with the promotional theme parameters, such as the threshold amount spent on game play, to determine if a promotion may be awarded. In one embodiment, a promotion may be awarded after a single transaction, such as when the transaction thread 359 comprises only a single cashless transaction 355, if an award is indicated when a property of the transaction thread after the single cashless transaction is compared to a promotion theme parameter.

In specific embodiments, identification information of the single user, which is used to relate the cashless transactions, 351, 352, 353 and 354, in the cashless transaction thread 359, may be obtained from the cashless instrument employed by the user. For instance, the cashless instrument, such as a smart card, a debit card, a personal digital assistant, a cell phone, a printed ticket with encoded information such as 1-D and 2-D bar-codes, a magnetic striped card, a wireless RFID tag with read and write capabilities and combinations of these devices (e.g., RFID tag embedded in a magnetic striped card), may be used to store user identification information that can be read from the cashless instrument and associated with the cashless transactions in the cashless transaction thread 359. Details of using RFID tags and 1-D/2-D barcodes are described in co-pending U.S. application Ser. No. 10/214,936, filed on Aug. 8, 2002, and entitled, "Flexible Loyalty Points Programs," which is incorporated herein in its entirety and for all purposes.

In another embodiment, the identification information of the single user may be obtained from a player tracking account. For example, the user may initiate a player tracking session prior to initiating the cashless transaction 355 and player tracking information may be included in the cashless transaction information that is used for the cashless transaction 355. In another example, the cashless instrument transaction clearinghouse may provide individual user accounts that may be accessed by an account number that is stored on a cashless instrument. When the single user uses a cashless instrument with their account number for a cashless transaction, such as 351, 352, 353 or 354, the account number can be used to identify the user from account information stored at the clearinghouse. In yet other embodiment, the single user may be provided with the option of supplying identification information at the cashless site, which may be used to associate the cashless transaction with a particular user.

Multiple cashless instruments may be used for the cashless transactions in a cashless transaction thread. For instance, in the previous example, a series of printed tickets with identification information may be used as cashless instruments for the cashless transactions, 355-358, in cashless transaction thread 359 where a new printed ticket is issued after each transaction. In another example, a magnetic striped card may be used to generate cashless transactions 355 and 356 and printed tickets may be used for cashless transactions 357 and 358 in thread 359. In yet another example, a cashless instrument with a 2-D bar-code may be used for a transactions 355 and 356 and a cell phone may be used for cashless transactions 357 and 358 in thread 359.

The cashless transactions in a cashless transaction thread are not necessarily limited to transactions by a single user. For example, the cashless transactions, 361, 362 and 363, in cashless transaction thread 364 may be related according to a time period during which they occur. For instance, the cashless transaction thread criteria for thread 364 may be all of the cashless transaction that are performed on Thursday. Therefore, in this example, three cashless transactions, 361, 362 and 363, may be performed by three different users at the cashless sites 353, 354 and 360 during the time period specified by the cashless thread criteria and the cashless transactions may be grouped into the cashless transaction thread 364. As described above, based upon the properties of the cashless transaction thread 364 and promotion theme parameters applied by clearinghouse server 136, a promotion may be awarded to an individual that has used a cashless instrument to perform a cashless transaction.

In the example described, above the use of identification information was used in awarding a promotion to a user. The present invention is not so limited. A promotion may be awarded to an individual anonymously without requiring identification information from the individual.

The cashless sites, 351, 352, 353, 354 and 360, are not limited to gaming machines. A cashless instrument validation request may be received at the clearinghouse to validate and indicia of credit value stored on the cashless instrument to enable i) a wager on a table game, ii) a play of a keno game, iii) a play of a bingo game, iv) a wager on a sporting event, v) a wager on a game of chance played on a gaming device located in a hotel room, vi) a wager on a game of chance on a gaming machine, vii) a food purchase, viii) a service purchase, ix) a merchandise purchase, x) an entertainment event purchase, xi) a rental purchase and xii) combinations thereof. Thus, the cashless site may be a gaming device appropriate to the venue from where the validation request is being made. In addition, the clearinghouse may store records of the transactions involving wagers, plays of games of chance, food, service, merchandise, rental and entertainment purchases. When information is made available to the clearinghouse regarding these transactions, the information may be utilized in cashless transaction threads generated at the clearinghouse.

When the comparison of the promotion theme parameters and the cashless transaction thread properties indicate that a promotion is to be awarded, the promotion may be generated at the clearinghouse server 136 and transferred to a player. The generation of the promotion at the clearinghouse may comprise one of initiating i) a download of promotional credits, ii) an issuance of a comp, iii) an issuance of a discount coupon, iv) an issuance of a cash award and v) combinations thereof. The promotional credits may be non-cashable credits.

The non-cashable credits are an example of restricted promotional credits that may be utilized in the present invention. Restricted promotional credits are credits that are limited in their use. For example, a restricted promotional credit may be limited for only game play use. Thus, a player may provide a cashless instrument with a number of promotional credits at a location where the restricted promotional credits may be used to play a game, such as but not limited to a gaming machine, a table game, a sports book, a bingo parlor and a keno parlor. If the player utilizes a portion of their restricted promotional credits for game play and in addition wins at the game they have played, then, at cashout, the player may be issued two cashless instruments, such as a two tickets. The first ticket may store the remaining restricted promotional credits while the second ticket may store a cash value representing the amount of their winning. The first ticket may be used for additional game play only while the first ticket may be redeemed for its cash value. In one embodiment, a single cashless instrument, such as a single ticket, may store both restricted promotional credits and a separate cash value.

Restricted promotional credits may be limited in many different ways. For instance, restricted promotional credits may be limited to a time period (e.g., certain times of day, certain a days of the week, a holiday period), a particular game (e.g., table games, sports book, keno, bingo, gaming machines, or a particular type of gaming machine), a particular location, or a combination of locations. Promotional credits may be also unrestricted. In this case, a cashless instrument may be issued storing promotional credits that may be redeemed for cash or for game play.

The transfer to the player may include sending information and commands to a remote gaming device that allows the promotion to be generated at the remote gaming device and awarded to a player. For example, the clearinghouse server 136 may direct a remote gaming device, such as a gaming machine at cashless site 351, to generate a cashless instrument, such as printed ticket, that may be redeemed for promotional credits on a gaming machine. In particular embodiments, promotional credits, comps, discount coupons, and cash awards may be stored on a cashless instrument generated at a cashless instrument generation site, such as cashless sites 351, 352, 353, 354 and 360 that are in communication with the cashless instrument transaction clearinghouse server 136.

In another embodiment, a promotion may be stored in an account. For instance, promotional credits may be available on an account accessible to a particular user. In another yet another embodiment, a promotion may be e-mailed to a user. For instance, an electronic file containing a cashless instrument that may be printed out by a user may be sent to an e-mail address of a user. When the cashless instrument is printed out, it may be redeemed for a promotion indicated by the cashless instrument. In a further embodiment, when a mail address is available, a promotion on a cashless instrument may be mailed to a user.

The clearinghouse 136 may be capable of receiving cashless instrument validation requests for a validation of promotional credits, comps, discount coupons and cash awards stored on cashless instruments or stored in user accounts. The promotional credits, the comp, the discount coupon and the cash awards that may be stored on cashless instruments or may be stored in user accounts may be redeemable at a plurality of gaming properties in communication with the clearinghouse 136. The cashless instrument with the stored promotion may be issued at a first gaming property and redeemed at a second gaming property.

In yet another embodiment, the processor may be capable of regulating access to the promotional credits stored on the first cashless instrument or stored in the user account. The promotional credits may be regulated to limit one or more of more of the following: i) a total amount used over a period of time, ii) a total amount used at a particular gaming property, iii) a total amount used at a group of gaming properties, iv) a use of the promotional credits on particular type of gaming machine, v) a use to a particular group of gaming machines, vi) a use of promotional credits only during certain time periods and vii) combinations thereof. The user account used for storing the promotional credits may be maintained at the clearinghouse, on a remote server in communication with the clearinghouse or combinations thereof.

The cashless transaction information and cashless thread information, such as thread properties, may be stored in a transaction database 130 at the clearinghouse. The organization of the database is not limited to structure shown in FIG. 9, which is provided for illustrative purposes only. In the database, an account 371 is shown. The account may be associated with a single user or a group of users. The account 371 is associated with two cashless instruments, 372 and 373. In general, a plurality of cashless instrument may be associated with the account 371. The cashless instruments, 372 and 373, may be utilized by a single user or multiple users. Therefore, an account 371 may be associated with one or more persons.

In FIG. 9, instrument 372, has been used for cashless transactions 361, 362 and 363. These cashless transactions have been related as a cashless thread 363 and associated with the instrument 372. Instrument 373 has been used for cashless transactions 355-358. These cashless transactions have been related as a cashless thread 359. Cashless thread information regarding the threads, 359 and 363, is stored in the database 130 under account 371.

The cashless instruments 372 and 373, may be used to store various instrument resources, 374 and 375, such as but not limited to promotional credits, cashable credits, cash, loyalty/player tracking points and other promotions. The instrument resources, 374 and 375, may be tracked by the clearinghouse server 136. The use of the instrument resources, 374 and 375, may be validated by the clearinghouse server 136.

Account resources 376 may also be associated with the account 371. The account resources 376, like the instrument resources 374, may be promotional credits, cashable credits, cash, loyalty/player tracking points and other promotions. The clearinghouse server may also validate the use of the account resources 376. For instance, the clearinghouse server may receive requests for account resources from the cashless sites, 351-354 and 360. When the requested resources are available and the cashless transaction has been approved, the resources may be transferred to a remote gaming device. Details of resource transfer and validation are described in more detail with respect to FIGS. 13A and 13B.

In one embodiment of the present invention, the clearinghouse server 136 may regulate the use of instrument resources, 374 and 375, stored on a cashless instrument and/or account resources 376 stored in the account 371 according to various criteria. One example of instrument or account resources is promotional credits. A few examples of regulation criteria for instrument or account resources that may be employed with present invention are: i) a total amount used over a period of time, ii) a total amount used at a particular gaming property, iii) a total amount used at a group of gaming properties, iv) a use of the resource on only particular type of gaming machine, v) a use only on a particular group of gaming machines, vi) a use of resources only during certain time periods and vii) combinations thereof.

In addition to validating the use of resources and regulating the use of resources at accounts maintained at the clearinghouse 136, the clearinghouse may validate and regulate the use of resources maintained as accounts on remote gaming device in communication with the clearinghouse 136. For instance, the clearinghouse may be used to validate the withdrawal of resources from a remote account. Further, the clearinghouse may be used to validate the transfer of resources between two accounts. For instance, the clearinghouse may validate/regulate a transfer of resources from an account maintained at the clearinghouse 136 to an account maintained on a remote gaming device. As another example, the clearinghouse may validate/regulate the transfer of resources between two remote accounts. In yet another example, the clearinghouse may be used to validate/regulate the transfer of resources from a first cashless instrument to a second cashless instrument. The validation and regulation processes may include the approval or rejection of a requested resource transfer.

Figure 10:
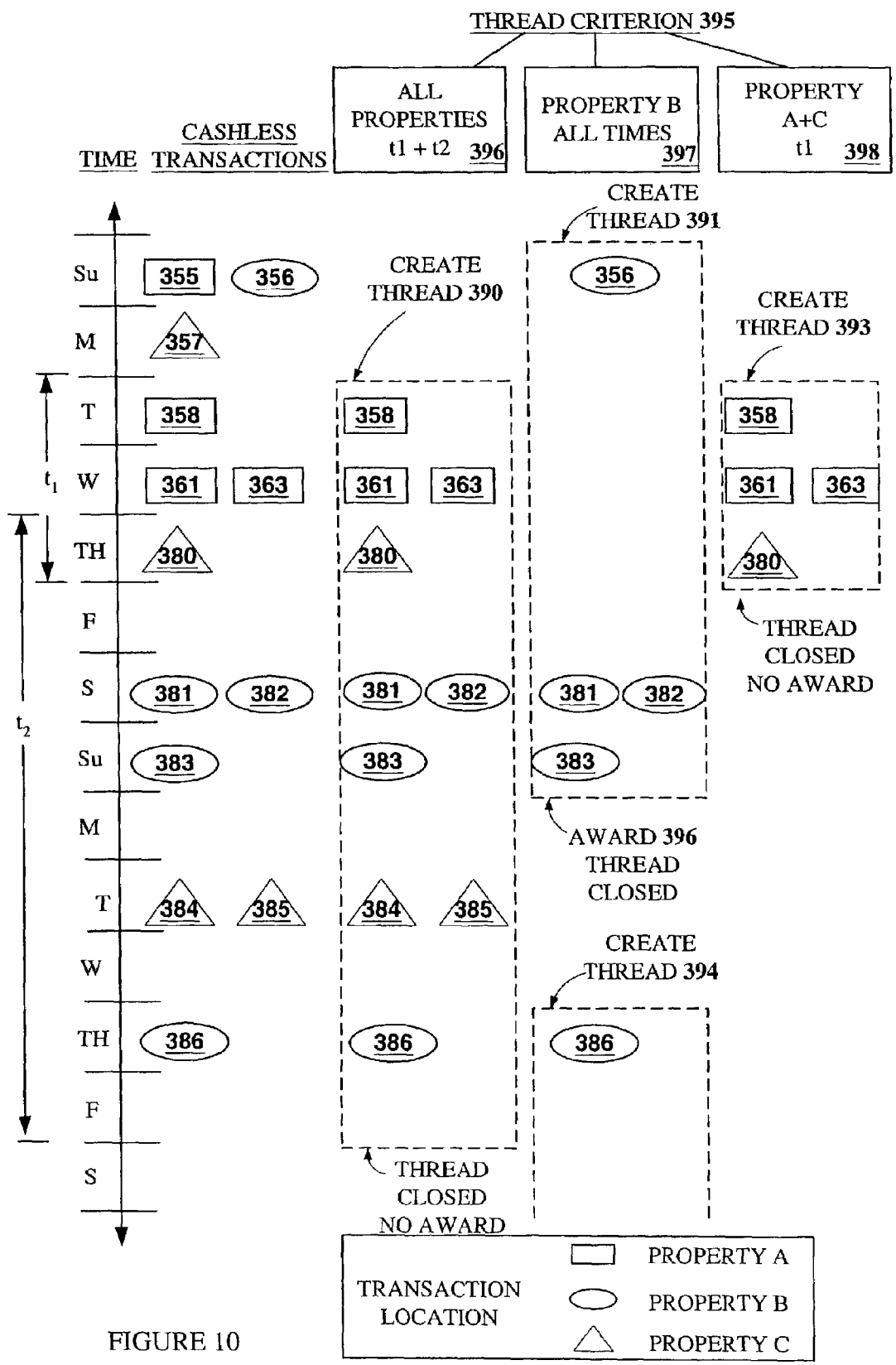
FIG. 10 is a flow chart showing a generation of cashless instrument threads in a cashless instrument transaction clearinghouse server.

FIG. 10 is a flow chart showing a generation of cashless instrument threads in a cashless instrument transaction clearinghouse server. The figure is used to illustrate the generation of cashless instrument threads at a cashless instrument transaction clearinghouse by applying three different combinations of thread criteria 395. The examples in FIG. 10 are provided for illustrative purposes only and the present invention is not limited to combinations of thread criterion described in the figure.

In FIG. 10, 13 cashless transactions, 355-358, 361, 363, 380-386, are generated at three gaming properties, A, B, C over a 12 day time period. The cashless transactions generated at property A are enclosed with a rectangular and include 355, 358, 361 and 363. The cashless transactions generated at property B are enclosed in an oval and include 356, 361, 363 and 386. The cashless s generated at property C are enclosed in a triangle and include transactions 357, 384 and 385. In one embodiment, these cashless transaction may be generated by a single player although the present invention is not limited to this scenario.

Three different groups of thread criterion 395 are used to generate cashless threads. The first group 396 includes transaction at all properties during time periods, $t_1$ and $t_2$. Time period, $t_1$, comprises a three-day period from Tuesday to Thursday. Time period, $t_2$, comprises 9 day time period from Thursday to a Friday of the next week and overlaps time period $t_1$ by one day. The second group 397 of thread criterion includes cashless transaction generated at property B at all times. The third group 398 of thread criterion include cashless transaction generated at properties A and C during time period $t_1$.

A cashless thread 390 is initially created for the first group 396 of thread criterion when cashless transaction 358 is performed during time period, $t_1$. When the thread is created, the properties of the cashless thread 390 may be compared against promotion theme parameters selected for the thread 390 to determine if an award has been triggered. Some examples of thread properties include but are not limited to i) a total amount spent on game play for the cashless instrument transactions comprising the cashless instrument thread, ii) a total amount spent on food purchases for the cashless instrument transactions comprising the cashless instrument thread, iii) a total amount spent on merchandise purchases for the cashless instrument transactions comprising the cashless instrument thread, iv) a total amount on spent service purchases for the cashless instrument transactions comprising the cashless instrument thread, v) a total amount spent on rental purchases for the cashless instrument transactions comprising the cashless instrument thread and vi) combinations thereof. Some examples of promotion theme parameters may include but are not limited to i) a threshold amount spent on game play, ii) a threshold amount spent on food purchases, iii) a threshold amount spent on merchandise purchases, iv) a threshold amount spent on service purchases, v) a threshold amount spent on rental purchases, vi) a random selection of the cashless instrument thread, vii) a time, viii) a gaming property location, and ix) combinations thereof.

After the cashless thread 390 is created, additional cashless transactions including 361, 363 and 380-386 are related to thread 390 over time using the first group 396 of thread criterion 395. After each cashless transaction is related to the cashless thread 390 using the criterion 396, the properties of the cashless thread may be updated and compared with the promotion theme parameters associated with the cashless thread 390 to determine whether an award has been triggered. In this embodiment, the time periods for thread 390 expire before an award is made based upon the thread properties and the thread 390 is closed. A record of the thread may be stored at the cashless instrument transaction clearinghouse.

A cashless thread 391 is initially created for the second group 397 of thread criterion 395 when cashless transaction 356 is generated. After the cashless thread 391 is created, additional cashless transactions including 381, 382 and 383 are related to thread 391 over time using the second group 397 of thread criterion 395. After cashless transaction 383, the properties of the thread 391 are compared with the promotion theme parameters for the thread and an award 396 is indicated. In one embodiment, the thread 391 is closed and no additional awards are made from the thread 391. In another embodiment, the thread 391 may be kept open and additional awards made by made as the properties of the thread 391 change. For instance, the promotional theme parameters may provide for a number of award thresholds that provide for additional awards as the properties of the cashless thread surpass the award thresholds, such as a first award after a first amount of game play has been surpassed and a second award after a second amount of game play has been surpassed where the amount of game play is cumulative.

In yet another embodiment, the cashless transactions used in a thread to generate thread properties may expire. For example, older cashless transactions may be removed from a cashless thread after a period of time has expired. Thus, although the cashless thread remains open, the properties of the thread may change as the older cashless transactions comprising the thread are removed from the thread.

Returning to FIG. 10, after an award 396 is made for thread 391, the thread 391 is closed. When a new cashless transaction, 386, is generated that satisfies the thread criterion 397, a cashless thread 394 is created. A subsequent award for this thread may be made when the properties of the thread 394 satisfy the promotion theme parameters associated with the thread. The promotion theme parameters associated with the thread criterion 395 may change with time. For instance, for the second group 397 of criterion, the promotion theme parameter may be a first threshold amount spent on game play for cashless thread 391 while the promotion theme parameter for the thread 394 may be a second threshold amount spent on game play. In another embodiment, the thread criterion for a cashless thread may change with time. Thus, for instance, for thread 390 after the time periods, $t_1$ and $t_2$, expire, rather than closing the thread 390, a new time period may be specified and the thread may remain open.

A cashless thread 393 is initially created for the third group 398 of thread criterion 395 when cashless transaction 358 is generated. As described with respect to FIG. 9, a single cashless transaction may be included in multiple cashless threads. Thus, in the examples in FIG. 10, cashless transaction 358 satisfies the criterion for the first group 396 and the second group 398 and its generation spawns two threads, 390 and 393. After the cashless thread 393 is created, additional cashless transactions including 361, 363 and 380 are related to thread 393 over time using the third group 398 of thread criterion 395. The thread 393 is closed prior to an award being made.

FIG. 11 is a simplified block diagram of a cashless instrument transaction clearinghouse server 136 connected to cashless systems and other account systems at multiple properties. Two gaming properties, 5 and 6, are shown connected to the clearinghouse server 136 via a network infrastructure 350. The network infrastructure 350 is connected to a local area network (LAN) 904 in gaming property 904 and local area network 905 in gaming property 6. Two gaming machines 903 and 909 are connected to LAN 904 and LAN 905 respectively. Each gaming machine includes a player tracking unit 270 with card reader 224, a network interface 253, a display 234 for displaying at least a game of chance, a printer 218, a bill validator 230, a master gaming controller 234 and a biometric interface 271.

The clearinghouse server 136 may be used to approve or reject a transfer of resources stored on a cashless instrument or in an account to another cashless instrument, a gaming device or another account. The resources may include any item of value stored on the cashless instrument, the gaming device or account. Examples of resources may include but are not limited to an indicia of credit, promotional credits, coupons and comps. In addition, the clearinghouse server 136 may be used to approve or reject the transfer of information regarding resources stored in an account or on a cashless instrument, such as but not limited an account status or cashless instrument status or balance. For the purposes of illustrations, a few examples of this aspect of the clearinghouse are described as follows. Further details are provided with respect to FIGS. 13A and 13B.

In one embodiment, the clearinghouse may be used to validate requests for the transfer resources i) stored on a cashless instrument or a gaming device, such as gaming machines, 903 and 909, to a local account, a remote account or a clearinghouse account maintained at the cashless instrument transaction clearinghouse (See FIG. 9), ii) stored in a local account, a remote account or a clearinghouse account to a gaming device or a cashless instrument or iii) between accounts. In particular embodiments, a transfer of a resource that is stored in an account or on a cashless instrument that is validated by the clearinghouse server may be used to enable i) a wager on a table game, ii) a play of a keno game, iii) a play of a bingo game, iv) a wager on a sporting event, v) a wager on a game of chance played on a gaming device located in a hotel room, vi) a wager on a game of chance on a gaming machine, vii) a food purchase, viii) a service purchase, ix) a merchandise purchase, x) an entertainment event purchase, xi) a rental purchase and xii) combinations thereof.

One scenario where a validation of a resource transfer request may occur is after game play on a gaming machine. During game play, the gaming machine may have awarded credits, promotional credits, comps/prizes, loyalty programs points. A player entitled to the accumulated credits, promotional credits prizes, loyalty program points may wish to transfer them to an account accessible to the player. Some examples of accounts which may be accessible to the player include but are not limited a bank account, a credit card account, a debit card account, a casino account, a loyalty program account and a clearinghouse account. The player may provide information at the gaming device, such as a gaming machines, 903 and 909, to verify their identity and verify their account access or at a kiosk. For instance, the player may provide an account number and user identification information, such as PIN number, password or biometric information to verify their identity and/or account access. Also, some of this information, such as an account number or biometric information, may be stored on a cashless instrument utilized by the player. Then, a transfer validation request may be sent from the gaming device to the clearinghouse server 136 requesting an approval or rejection of the transfer of resources from the gaming device to the account.

Account and user information required by the server 136 may be sent in transfer validation request. The server 136 then may send a reply that approves the transfer with information needed to complete the transfer or may send a reply with a rejection of the transfer. For instance, the server may supply security information needed to complete the transaction. Details of security methods that may be used with the present invention are provided in co-pending U.S. application Ser. No. 09/993,163 entitled "AN AWARD TICKET CLEARINGHOUSE", filed Nov. 16, 2001, which is incorporated herein in its entirety and for all purposes.

The approval of the transfer may enable a peer-to-peer transfer of the resource. For instance, the gaming machine 903 or 909 may be able to communicate with a remote device hosted the target account and perform the transfer transaction. In another embodiment, the clearinghouse server 136 may serve as intermediary in the transaction. First, the resources may be sent from the gaming device to the clearinghouse server 136 and then the clearinghouse server may arrange the transfer of resources from the server 136 to the target account. For example, promotional credits awarded on gaming machine 903 may be first transferred to the clearinghouse 136 and then may be transferred to a remote account 900. The router 132 in the clearinghouse server 136 or another memory device accessible to the server may contain routing information that allows the server to contact a gaming device hosting the target account, such as a gaming device located at a remote gaming property.

In another embodiment, the clearinghouse server 136 may be used to approve or reject a transfer of resources from a local or remote account to a gaming device or a cashless instrument. For example, a player playing the gaming machine 903 may desire to transfer credits from a local account on account server 907 at gaming property 6 to gaming machine 903 or from an account at the clearinghouse to the gaming machine. A validation request to clearinghouse server 136 may be used to approve or reject this cashless transaction. In the present invention, cashless transactions may include the validation of cashless instruments as well as the validation of resource transfers.

In yet another embodiment, the clearinghouse may be designed or configured to accept or reject cashless transactions based upon resource regulation criterion. The resource may be an instrument resource stored on a cashless instrument or an account resource stored in an account. Access to a resource stored in an account or a cashless instrument may be regulated according to: i) a total amount of the resource used over a period of time, ii) a total amount of the resource used at a particular gaming property, iii) a total amount of the resource used at a group of gaming properties, and iv) combinations thereof. The clearinghouse server may or may not distinguish between account and instrument resources. For instance, a total amount of the resource used over time may include resources from cashless instrument and accounts, such as a total cash amount spent from these sources or it may include a total amount of the resource spent from a regulated account.

In FIG. 9, it was described that the information used to generate a cashless thread may be obtained from many sources such as a player tracking server. For example, in 903, after a cashless instrument is validated by the clearinghouse server 136, a player may begin a game play session on gaming machine 903. Prior to beginning the game play session, a player may also initiate a player tracking session at the gaming machine. In one embodiment, information obtained from the player tracking session, such as but not limited to an amount spent on game play and/or identification information for the user may be sent to the clearinghouse server by the gaming machine 903, the player tracking unit 270 or the play tracking server 901. This information may be associated with the cashless transaction validated by the clearinghouse server 136 or a player account maintained by the clearinghouse server. The information may be used to generate cashless threads.

In one embodiment, after a cashless instrument is validated on a gaming machine, such as 903 or 909, the clearinghouse server 136 may be able to contact a player tracking account server, such as 901 or 906, to request additional information about the player if an approved cashless instrument validation request has been in the context of a player tracking session on the gaming machine. In response to the request, the player tracking server may send additional information to the clearinghouse such as what portion of credits deposited to a gaming machine from a cashless instrument were used for game play.

The clearinghouse server 136 may also be able to communicate with other devices that record transactions made by a player. For instance, the clearinghouse server (or servers) 136 may be able to communicate with a hotel registration system that contains transaction information regarding lodging or food purchases made by a player. The clearinghouse server 136 may initiate contact with the remote device such as a hotel registration system or the remote device may initiate contact with the clearinghouse server 136.

Figure 12:
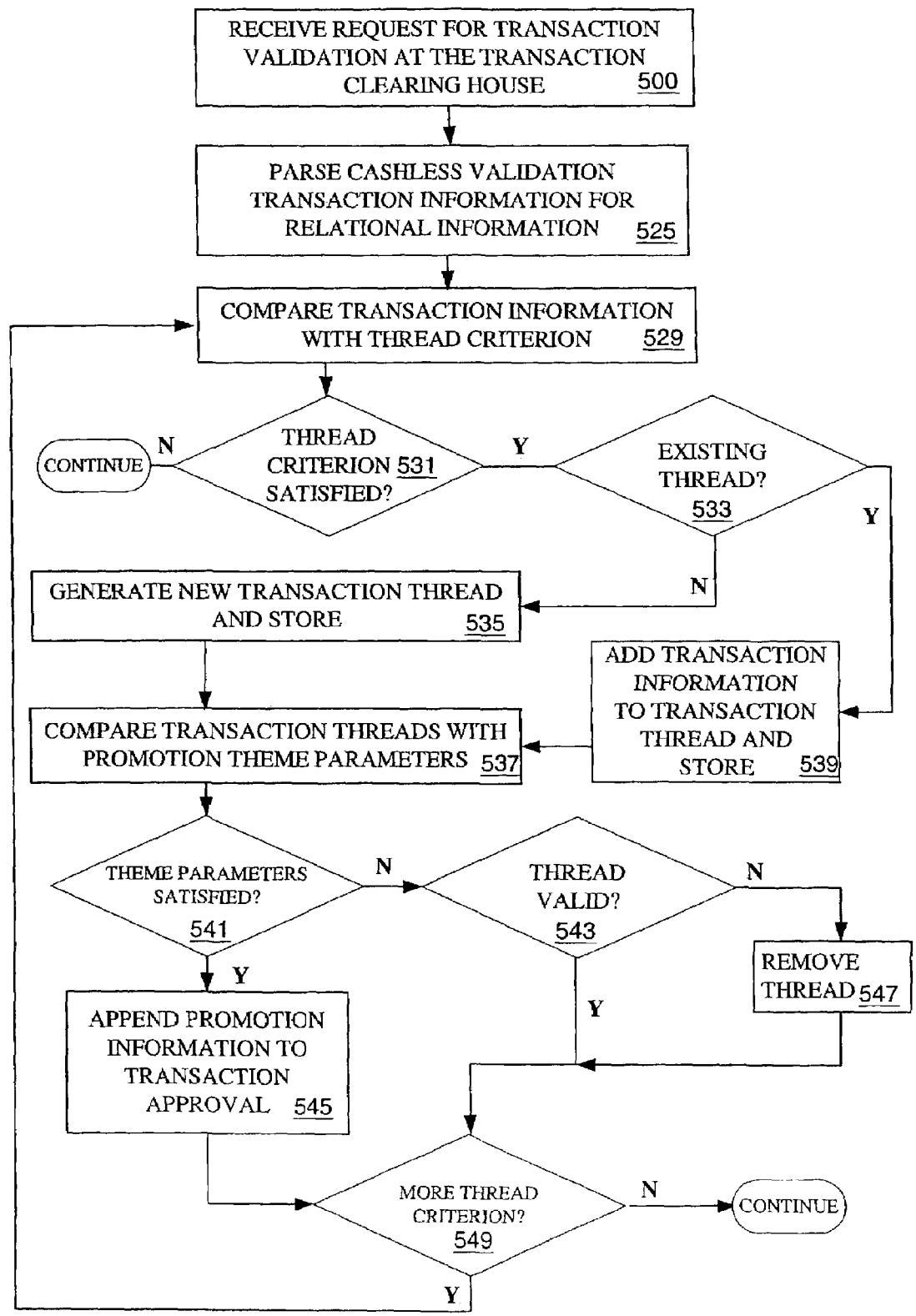
FIG. 12 is a flow chart of a method for providing an award using the cashless instrument transaction clearinghouse.

FIG. 12 is a flow chart of a method for providing a promotion using the cashless instrument transaction clearinghouse for one embodiment of the present invention. In 500, the transaction clearinghouse receives a request for a transaction validation. The transaction validation request may be for a cashless instrument previously generated at a gaming property in communication with the award clearinghouse. In 525, the award clearinghouse may parse the validation request for transactional information that may be used to relate cashless transaction to other cashless transactions stored at the clearinghouse. Examples of transactional information include but are not limited to a gaming property location, a time and user identification information.

In 529, the clearinghouse may compare the transactional information with thread criterion. In 531, when none of conditions defined by the checked thread criterion are satisfied, the processor may continue to process the transaction. In 531, when one or more conditions of a thread criterion are satisfied, then in 533, the processor may check to determine if a cashless thread corresponding to the criterion has previously been generated. In 535, when a cashless thread satisfying the thread criterion does not exist, then the processor may generate a cashless transaction thread, generate its initial properties and store the thread. The storage process may involve generating a file that points to transaction in the transaction database.

In 533, when a cashless thread that satisfies the criterion has been previously created and is still active, then in 539, the existing cashless thread may be updated with the transaction information from the cashless transaction. The update process may include but is not limited to generating updating properties for the cashless thread and updating a file that points to transactions stored in the transaction database that are related by the cashless thread. The file may also be used to store the cashless thread properties. The updated file may be stored in a memory device used by the server. As described with respect to FIGS. 9 and 10, a single cashless transaction may be used in multiple cashless threads if thread criterion for the threads overlap. Thus, steps 531, 533, 535 and 539 may be repeated multiple times as the processor compares the transaction information to a plurality of different thread criterion.

In 537, the promotion theme parameters for the cashless thread are compared with the thread properties. The thread properties and promotion theme parameters may vary from thread to thread and as a function of time. In 541, in one embodiment, when the theme parameters are satisfied, promotion information may be appended to a transaction approval. The promotion information may be utilized to generate a cashless instrument storing the promotion. The promotion may be one of promotional credits, normal credits, a comp, a discount coupon, merchandise, a service, a cash award and combinations thereof. In another embodiment, when user information is available, the promotion information may be transferred to a user account and the player may receive a message notifying them of their promotion. The message may be sent to a player's e-mail account, mailing address, cell phone or to the gaming device where a cashless transaction is being generated. In yet another embodiment, the promotion may be credited to a gaming device where the cashless transaction is being carried out. For instance, when a validation is taking place at a cashier station, the cashier station may be notified of the promotion and the cashier may be able to issue a cashless instrument with the promotion.

As another example, when the cashless transaction is being carried out at a gaming machine, the gaming machine may be directly credited with promotional or normal credits that a user may use for game play. The gaming machine may display a message indicating that the player has won the promotional credits. If the player does not wish to use the promotional credits or normal credits, the gaming machine may be able to generate a cashless instrument storing the promotional or normal game play credits. Using the clearinghouse, the promotional credits or normal credits may be validated at a plurality of different gaming properties, only at certain properties or only at certain groups of properties.

In 543, the processor may determine whether the thread is still valid, the thread may be no longer valid because an award was made or conditions described in the thread criterion such as a time period may no longer be valid. In 547, when the thread is no longer valid, in one embodiment, the thread may be removed. The thread may be removed if an award was made for the thread but this action is optional. In another embodiment, the thread may be marked as inactive. The thread may later be activated if the thread criteria are changed for the thread. In 549, the processor may check for additional thread criterion, if additional thread criteria are present, the method returns to 529. Thus, in some cases, multiple promotions may be triggered by a single cashless transaction.

Figure 13A:
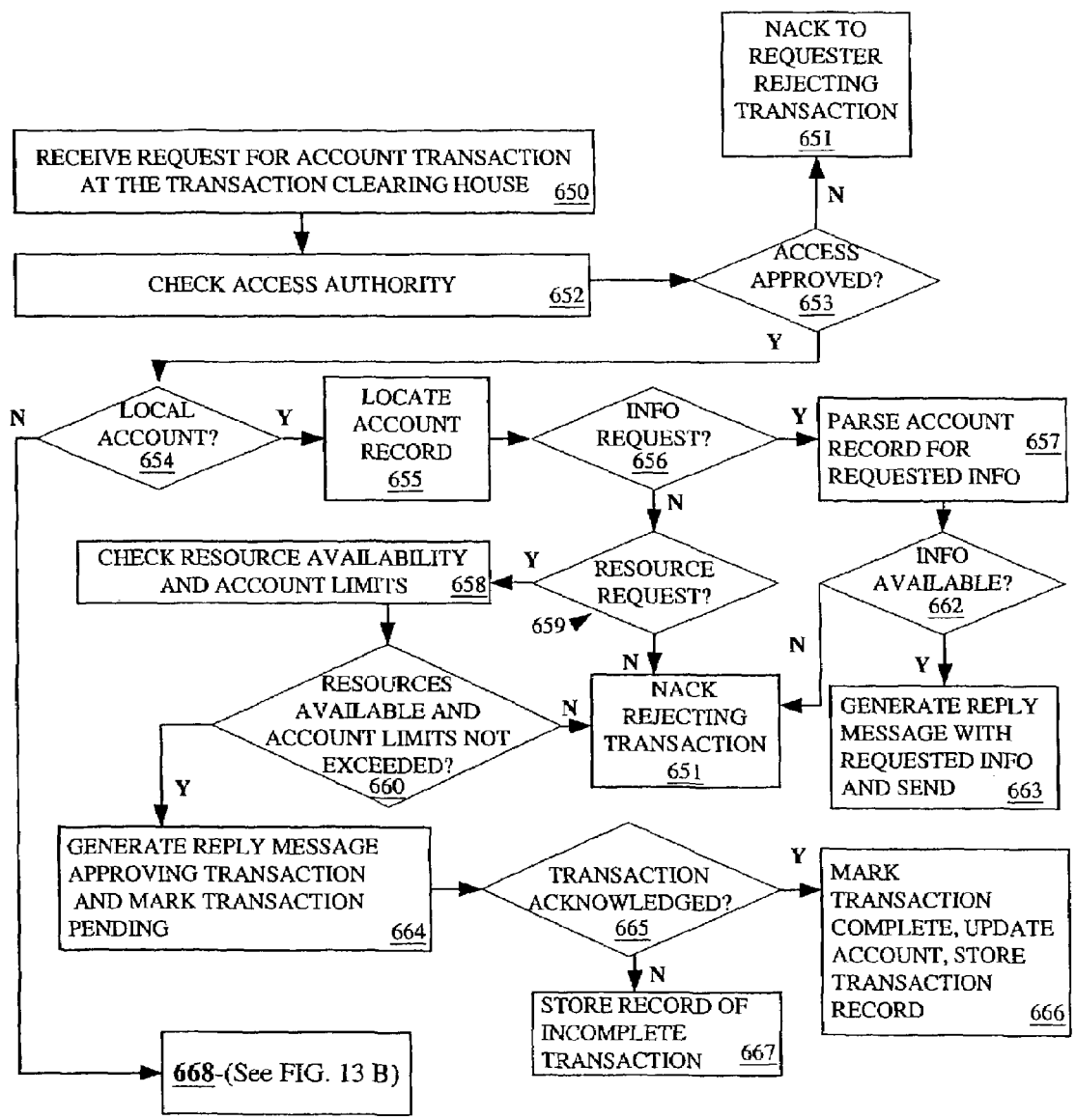
FIGS. 13A and 13B are flow charts of a method for transferring resources using the cashless instrument transaction clearinghouse.
Figure 13B:
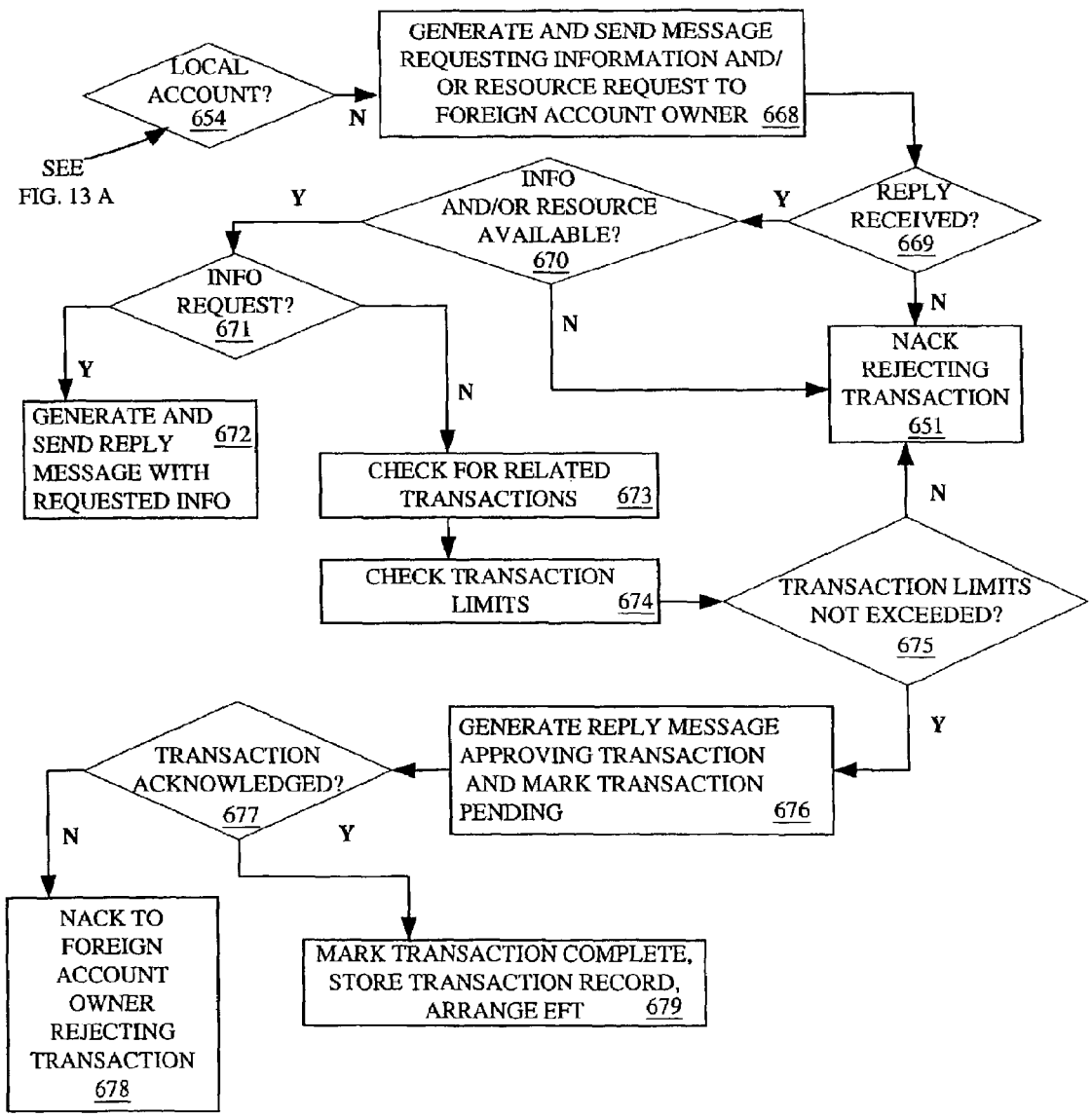

FIGS. 13A and 13B are flow charts of a method for transferring and regulating resources using the cashless instrument transaction clearinghouse. In 650, a cashless transaction involving one or more accounts is received by the clearinghouse. In 652, access authority for the account is confirmed. The access authority may be checked by the clearinghouse or at a gaming device. For instance, a user may enter a PIN number that grants access to an account at a gaming device. The gaming device may then send confirmation to the clearinghouse that PIN number associated with the account is correct. In another embodiment, the PIN number and account information may be sent to the clearinghouse which then performs the validation. In 653, access to one or more accounts may be approved or may be rejected. An access to multiple accounts may be required when an account to account transfer is requested.

In 653, when access to the one or more accounts is approved, the clearinghouse may determine if one the accounts are local accounts maintained at the clearinghouse. In 655, when the account is a local account, the clearinghouse may locate the account record. In 656, the clearinghouse may check whether the request is for information. In 657, when the request is for information, the clearinghouse may parse the account record for the requested information. In 662, the clearinghouse may determine whether the requested information is available. In 663, when the information is available, the clearinghouse may generate a reply message with the requested information and send the reply to the requestor of the information. When the information is not available, in 651, a non-acknowledgement (NACK) message may be generated indicating the information is not available.

In 669, when the account transaction is not an information request, the clearinghouse may check if the transaction is a resource request. When, the transaction is not a resource request, the clearinghouse may send a NACK message indicating the request can't be processed. In this example, the clearinghouse handles transactions involving information requests and resource requests, other requests such as resource transfers may also be requested. Thus, in general, the clearinghouse may determine what type of transaction is being requested and if it is not one of the transactions available at the clearinghouse it may be rejected.

When a resource is requested, in 658, the resource availability may be checked as well as account limits for resource access. For instance, the request may be for an amount of cash that is greater than what is stored in the account. In 660, when the resource is not available or a resource limit has been exceeded, a NACK message may be sent in 651.

In 664, when the resource is available and account limits or other regulation requirements have not been exceeded, a reply message may be generated approving the transaction and the transaction may be marked pending. The clearinghouse may then wait for the transaction to be acknowledged. When the transaction is not acknowledged in 665, in 667 an incomplete a record of the incomplete transaction may be generated and stored at the clearinghouse. When the transaction is acknowledged, the transaction may be marked complete, the account may be updated to reflect the transfer of resources and a transaction record may be stored.

Turning to FIG. 13B, in 654, when the account in the transaction is remote to the clearinghouse, in 668, the clearinghouse may determine the location of the foreign account. Then, the clearinghouse may generate and send a message indicating what is requested (e.g., information, a transfer of resource to or from the remote account) to the foreign account owner. Then, the clearinghouse may wait for a reply from the foreign account owner. When a reply is not received in 669, a NACK message may be sent to requestor of the transaction rejecting the transaction.

When a reply is received, in 670, the reply message is parsed to determine whether the requested information, resources or type of transaction is available. When the transaction can't be completed a NACK may be sent in 651. In 671, the clearinghouse may determine if the transaction is an information request. When the request is an information request, in 672, the clearinghouse may generate and send a reply message to the requestor with the requested information. For instance, when the requested information was an account balance, this information may be sent in a reply to the requestor.

When the request is a resource request, in 673, the clearinghouse may check for related transactions. For example, if an identity of a user is associated with the account, the clearinghouse may check for other transaction by the user over some time period. In 674, the clearinghouse may check transaction limits that may be regulated by the clearinghouse. For instance, in one embodiment, a user may have access limited to a certain amount of funds over a period of time from one or more accounts available to the user, such as a limit of $1000 dollars per day.

When the transaction limits are exceed in 675, then a NACK may be sent in 651 for the transaction and the transaction may not be completed. When the transaction limits are not exceeded in 675, in 676, a reply message may be generated approving the transaction and a record of the transaction may be generated with the transaction marked pending. In 677, when the transaction is acknowledge, the clearinghouse may mark the transaction complete, store a transaction record and arrange for an EFT to account for the resource transferred from the foreign account to the requester. In another embodiment, the clearinghouse may send a message to the foreign account owner to acknowledge that the resources have been transferred and the foreign account owner may update the account. In 678, when the transaction is not acknowledged, a NACK to the foreign account owner may be sent to indicate that the transaction was not completed.

Figure 14:
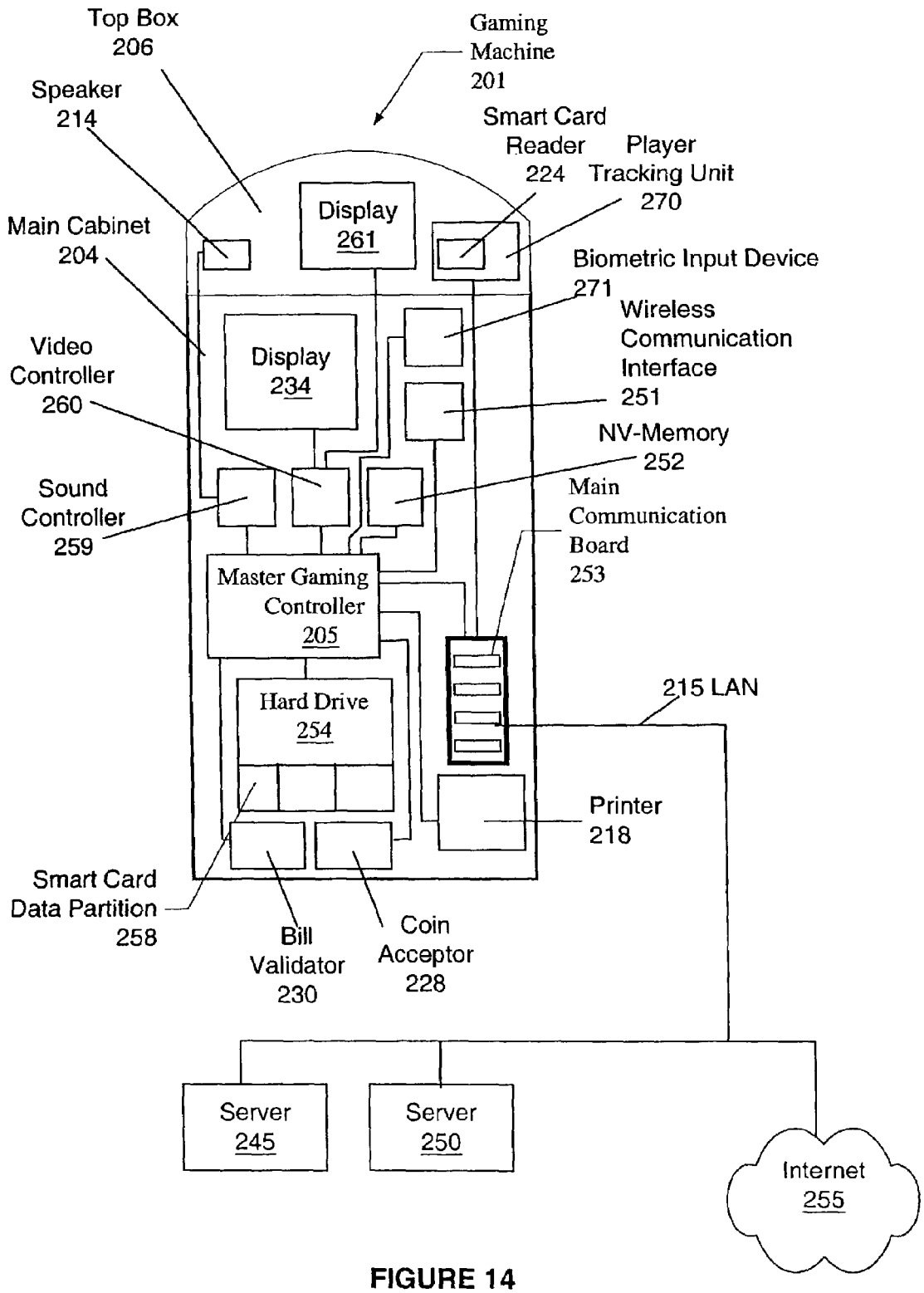
FIG. 14 is a simplified block diagram of a gaming machine and gaming network in which various embodiments of the present invention may be implemented.

FIG. 14 includes a block diagram of the components of a gaming machine 201 for use with various embodiments of the present invention in which the gaming machine is connected to a local area network 215. Components that appear in gaming machine 100 of FIG. 1 are identified by common reference numerals. A master gaming controller 205 controls the operation of the various gaming devices and the game presentation on the gaming machine 201. Using a game code and graphic libraries stored on the gaming machine 201, the master gaming controller 205 generates a game presentation, which is presented on the displays 234 and 261. The game presentation is typically a sequence of frames updated at a rate of 75 Hz (75 frames/sec). For instance, for a video slot game, the game presentation may include a sequence of frames of slot reels with a number of symbols in different positions. When the sequence of frames is presented, the slot reels appear to be spinning to a player playing a game on the gaming machine. The final game presentation frames in the sequence of the game presentation frames are the final position of the reels. Based upon the final position of the reels on the video display 234, a player is able to visually determine the outcome of the game.

Each frame in a sequence of frames in a game presentation is temporarily stored in a video memory located on the master gaming controller 205 or alternatively on the video controller 260. The gaming machine 201 may also include a video card (not shown) with a separate memory and processor for performing graphic functions on the gaming machine 201. Typically, the video memory includes one or more frame buffers that store frame data that are sent by the video controller 260 to the display 234 or the display 261.

The frame data stored in the frame buffer provide pixel data (image data) specifying the pixels displayed on the display screen. The master gaming controller 205, according to the game code, may generate each frame in one of the frame buffers by updating the graphical components of the previous frame stored in the buffer. In a similar manner, the master gaming controller 205 may generate audio components that are output to a speaker 214 using the sound controller 259.

The video and audio components of a game presentation, as well as the configuration of the gaming machine during game play, may be affected by game components stored on a smart card or by gaming instructions generated by applications executing on the smart card. Game graphic components and game sound components may be downloaded from memory on the smart card via the smart card reader 224. The smart card reader may be part of a player tracking unit 270 mounted within the gaming machine or may be a separate peripheral device in direct communication with the master gaming controller on the gaming machine 201. For instance, images stored on the smart card, in a graphics format such as MPEG, may include player-specific images. Sounds stored on the smart card, in a sound format such as MP-3, may include, for example, one or more of a player's favorite songs.

The graphical and sound oriented game components may be incorporated into a game presentation on the gaming machine 201 and presented to the player using the displays, 234 and 261 and the speaker 214. Game component information from the smart card may be stored in RAM memory on the master gaming controller 205, may be stored in a smart card data partition 258 of a hard drive 254, may be store in a nonvolatile memory 252 or may be stored in some other memory location on the gaming machine. The game components used in the game presentation may be preloaded into the smart card at the time the player receives their smart card or may be downloaded to the card from a remote location while the smart card is in use at the gaming machine 201.

Alternatively, game configuration parameters and denomination selection parameters may be loaded on the smart card at the time the smart card is issued. The initial parameters on the smart card may be set by the casino or may be defined by the player. During game play, a player may insert their smart card into the gaming machine 201 using the smart card reader 224. After the smart card is inserted into the smart card reader 224, the smart card reader 224 may transfer game configuration parameters and denomination selection parameters to the master gaming controller 205 via the main communication board 253. Then, based on the configuration parameters stored on the smart card and downloaded to the gaming machine, certain game types, such as card games, spinning reel games, test games available only on certain gaming machines, or other specialty game types available on the gaming machine 201 may be displayed while other games available on the same gaming machine may not be displayed. To initiate game play on the gaming machine, the player may first select from among a number of displayed games available on the gaming machine.

While the player is playing one or more games on a particular gaming machine, a smart card inserted into the smart card reader 224 may regularly communicate with the gaming machine 201. For instance, while the smart card is inserted into the smart card reader 224, the smart card may receive regular updates of game play history information, such as money accepted into the gaming machine via the bill validator 230 and coin acceptor 228 or an amount wagered on a particular game, from the master gaming controller 205 on the gaming machine 201. The game play history information sent by the master gaming controller may be used to update game play history information stored on the smart card by one or more gaming applications executed on the smart card, such as the bonus game application, the voucher application, the paytable application and the progressive game application.

A smart card inserted into a smart card reader 224 may communicate with a master gaming controller 205 using communication protocols unique to smart cards, may use communication protocols common to gaming machines or combinations of both. For instance, a smart card may communicate with the gaming machine 201 using a Slot Accounting System (SAS) protocol or a Netplex communication protocol developed by IGT (Reno, Nev.). When a smart card is inserted into a gaming machine 201, the smart card may establish communications with the gaming machine in some standard communication protocol used by both the gaming machine 201 and the smart card. Then, the smart card may send the gaming machine a list of gaming applications and communication protocols supported by the smart card which may be used in a game play sequence on the gaming machine. Further, the gaming machine may send the smart card gaming machine identification information such as gaming machine serial number which may be used by the smart card to determine what gaming applications and communication protocols are supported by the gaming machine.

The smart card may communicate with other devices other than the gaming machine when inserted into the smart card reader 224. For example, via the main communication board 253 on the gaming machine, the smart card may communicate with one or more game service servers, such as server 245 and 250, connected to the gaming machine 201 via a LAN 215. The game service servers may provide one or more game services such as an accounting server, a bonus game server, a progressive game server, a player tracking server and a cashless system server. In addition, the smart card may communicate with devices in communication with the gaming machine via a wide area network such as the Internet 255.

By communicating with remote servers connected to a gaming machine, a smart card may augment the services provided by these remote servers in a distributed manner. For instance, player tracking services are usually only provided to gaming machines connected in a dedicated network to a player tracking server. Using the smart card, a player may engage in game play sequences on a plurality of gaming machine that are not connected to the dedicated communication network of a player tracking server and then engage in a game play sequence on a gaming machine connected to the player tracking server. When the smart card is inserted into a smart card reader on the gaming machine connected to the player tracking server, the smart card may contact the player tracking server and send game play information to the player tracking server about game play recorded on the smart card from game play sequences on gaming machines not connected to the player tracking server. The game play recorded the smart card may be obtained using player tracking gaming instructions generated by a player tracking gaming application executed on the smart card. Thus, with the smart card, player tracking services may be extended to gaming machines not connected to the player tracking server. In a similar manner, using a smart card, other gaming services provided by a game service server may be extended to gaming machines not connected to the game service server.

The smart card may communicate with the gaming machine 201 via communication interfaces other than the smart card reader 224. For instance, a player may carry a portable wireless communication interface that accepts a smart card. Thus, the smart card inserted into the portable wireless communication interface may communicate with the gaming machine 201 using the wireless communication interface 251.

The functions of the smart card described above may be performed by other gaming devices. For instance, a player may carry a personal digital assistant (PDA) or a cell phone that executes gaming applications such as a bonus game application, a voucher application, a progressive game application and a paytable application. The PDA may communicate with the gaming machine via a wireless communication interface, such as 251. In the manner described above for the smart card, gaming applications executing on the PDA may generate gaming instructions containing information and commands to the gaming machine. The gaming instructions, from the PDA, may be executed by the gaming machine as part of a game play sequence on the gaming machine. There are many different types of PDAs from many different manufacturers. One example of a PDA that may be adapted for such use is the Palm VII from Palm, Inc., Santa Clara, Calif.

Specific embodiments of the present invention will now be described in which credits for playing a particular game or set of games are distributed and used to effect play of the designated game(s). These embodiments will be described with reference to a promotional card or device with which indicia of credit are associated. It should be noted that the promotional device may be any of a variety of devices including any of the instruments and mechanisms described above with reference to FIGS. 1 and 2 by which credit and other types of information may be communicated to a gaming machine.

For example, a ticket voucher (e.g., ticket 220 of FIG. 1) printed by or for use with a gaming machine may have a bar code thereon which encodes a credit amount and identifies a specific gaming application or set of gaming applications for which the credit may be redeemed. Alternatively, the smart card described above could have similar game-specific credit information stored directly on the smart card or have information on the smart card which points to the game-specific credit information on some remote storage device, e.g., servers 245 and 250 of FIG. 14. According to specific embodiments in which smart cards are used to distribute game-specific credits, the provider of the credits has the option of disabling certain system features for play associated with the game-specific credits. That is, for example, it might be desirable to disable player tracking functions (in which a player accrues points for playing games) when the game-specific credits are redeemed.

As yet another alternative, the game-specific credit information may be magnetically encoded in the magnetic strip of a promotional card which may be read by the gaming machine's card reader. According to a specific embodiment of the invention, such promotional cards include graphical elements on the cards which are specific to the game or games being promoted. These graphical elements may, for example, correspond to the graphical elements associated with the promoted game and are designed to generate interest in the promoted game. More generally, a wide variety of mechanisms are envisioned by which game-specific credits are distributed and used to enable operation of gaming machines. Therefore, the present invention should not be limited to the examples given.

Figure 15:
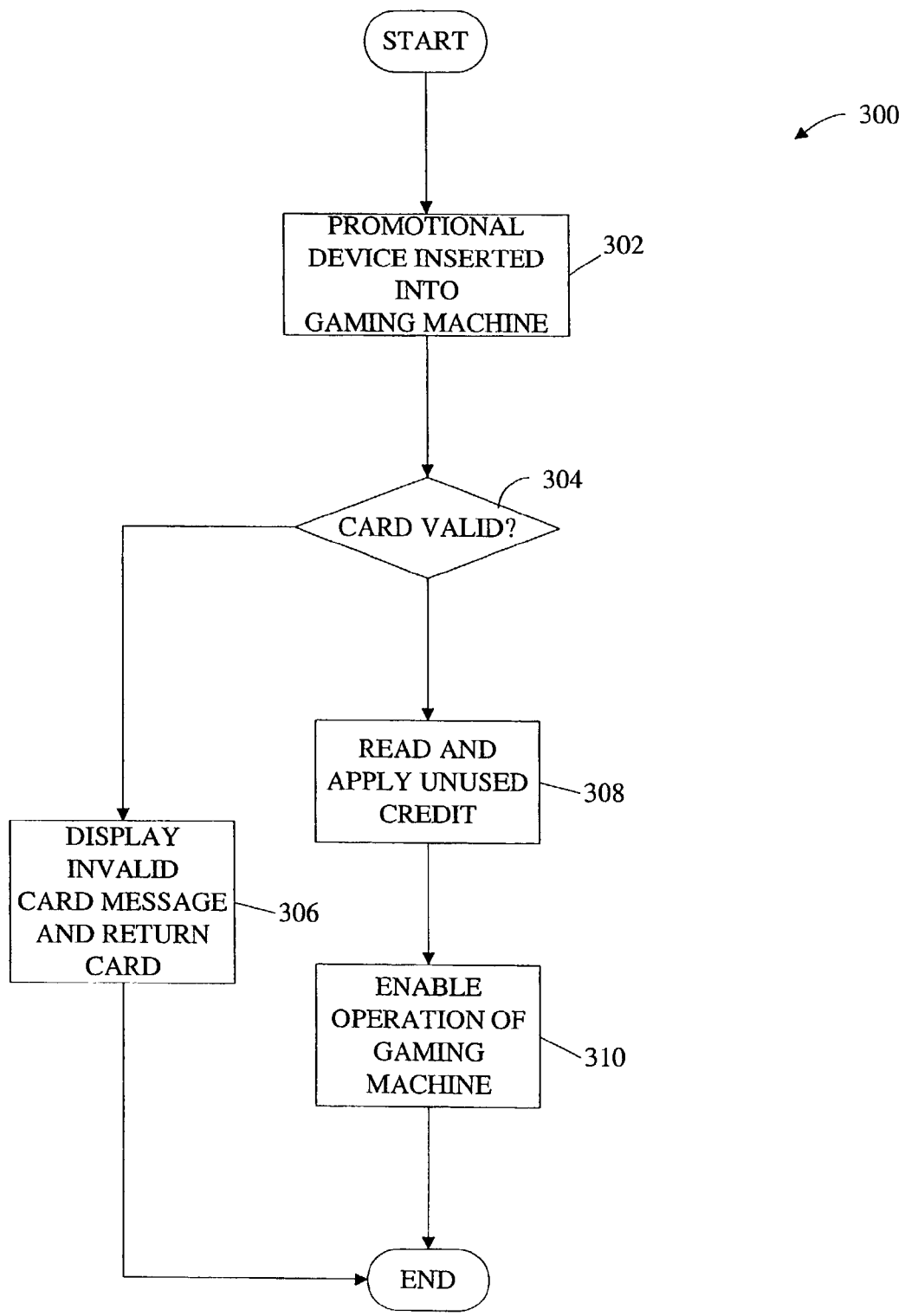
FIG. 15 is a flowchart illustrating redemption of game-specific credits according to a specific embodiment of the invention.

FIG. 15 is a flowchart illustrating redemption of game-specific credits according to a specific embodiment of the present invention. In this exemplary embodiment, the player has been provided with a promotional card having a magnetic strip which encodes information including some indicia of credit, e.g., $5, and identifying a specific game for which the credit may be redeemed. Such a card might be provided, for example, by a gaming establishment or gaming machine manufacturer for the purpose of promoting use of a newly deployed gaming machine. According to some embodiments, the encoded information associated with such a promotional card may identify multiple games for which the credit may be used. According to other embodiments, the encoded information may also indicate whether the credit for the game(s) identified may be used at a single gaming venue, or multiple venues associated with, for example, a chain of casinos associated with a particular operator.

Upon insertion of the promotional card into a gaming machine (302), it is determined whether the encoded information corresponds to a gaming application associated with the gaming machine and whether any credit is left (304). If not, the card is returned to the customer and an appropriate message is displayed which indicates that the inserted card is not valid for this machine (306).

If, on the other hand, the encoded information on the card identifies one or more gaming applications associated with the gaming machine and there is unused credit (304), the amount of credit indicated on the card is read (308) and operation of the designated gaming application in a manner which corresponds to the credit value is enabled (310). In embodiments where multiple games are associated with the gaming machine, operation of the gaming machine may be restricted only to those gaming application identified by the promotional card. In addition, the credit value associated with the card may be restricted to being used to effect play of the intended game. That is, it will not typically be redeemable for cash.

In embodiments in which a smart card (described above) is employed to implement the invention, the information on the smart card could identify both the promoted gaming application and the amount of the credit. Alternatively, the smart card could merely indicate that the player has a credit, additional information about which may be retrieved from a remote storage device. According to such an embodiment, the gaming machine would communicate with the remote storage device as described herein to effect the verification and crediting process described above with reference to FIGS. 4-6 and 14.

According to some embodiments, the promotional card of the present invention may also be user-specific, including information identifying one or more persons authorized to redeem the credits. In such embodiments, the user may be verified with reference to the user's information on a debit card or a smart card. Alternatively, the user could be required to enter an authorization code associated with the promotional card.

In addition, and as described above, functions typically enabled by use of such a smart card may be disabled for game play associated with the redeemed credits. That is, the gaming venue may not desire to provide free use of a new gaming machine while simultaneously allowing the player to accrue points in the manner described above. Alternatively, the player tracking services could be altered to track play corresponding to the redeemed credits for tracking or other purposes.

While the invention has been particularly shown and described with reference to specific embodiments thereof, it will be understood by those skilled in the art that changes in the form and details of the disclosed embodiments may be made without departing from the spirit or scope of the invention. For example, specific embodiments of the invention have been described with reference to a gaming machine in which the various components of an associated gaming application are stored in the gaming machine itself. It will be understood, however, that the present invention may be implemented in distributed gaming environments in which the various objects associated with a gaming application may be stored in a variety of locations on a local or wide area network (e.g., the gaming machine and a remote gaming server) and/or shared among more than one gaming application.

It will also be understood that, according to some embodiments, use of the promotional devices embodied by the present invention may be restricted or expanded in a variety of ways. For example and as described above, a promotional device designed according to the invention may identify more than one game to which its credit may be applied, e.g., games provided by the same manufacturer. It should also be understood that the use of such a promotional device may additionally be limited to a single gaming establishment property or expanded to multiple properties in a chain or a particular geographic region.

According to still other embodiments, the information associated with a promotional device designed according to the invention need not be conveyed to the gaming system by insertion of the promotional device into a gaming machine. For example, information printed on a promotional ticket or card may be manually input into the system by the holder using any conventional type of user interface, e.g., a keypad or touch screen. Such a device may be useful where, for example, the gaming system is an Internet gaming system in which players participate using, for example, personal computers. In such an embodiment, the holder of the promotional card or ticket could input a string of alphanumeric characters associated with the card using his keyboard, in response to which a specific amount would be credited to that player for use in playing a specific game or set of games, or for use at a particular gaming site or set of gaming sites, in much the same way as described above with reference to FIG. 14.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. An apparatus for facilitating the use of cashless instruments across separate gaming properties, each of which including at least one device that generates or validates cashless instruments, the apparatus comprising:
   a network interface allowing the apparatus to communicate with a plurality of cashless systems including the at least one device at each of the separate gaming properties; and
   a processor configured or designed to (i) receive a cashless instrument validation request via the network interface from a first device coupled to a first cashless system and located at a first property for a cashless instrument presented for validation at the first property where the cashless instrument was generated at a second property (ii) in response to the cashless instrument validation request, send a message including information stored on the cashless instrument, via the network, to a second device coupled to a second cashless system at the second property requesting the validation of the cashless instrument using the information wherein, after validation, the cashless instrument is redeemable for at least game play credit, iii) validate a promotion stored on one of the cashless instruments.

2. The apparatus of claim 1, wherein the cashless instrument storing the promotion is redeemable for one of game play credit, merchandise and combinations thereof.

3. The apparatus of claim 1, wherein the cashless instrument storing the promotion is generated at a gaming machine at the first property and redeemed at the second property.

4. The apparatus of claim 1, wherein the promotion is offered according to one or more promotion theme parameters.

5. The apparatus of claim 4, wherein a first promotion theme parameter is game play on a specific type of gaming machine.

6. The apparatus of claim 4, wherein the cashless instrument storing the promotion is only redeemable at a specific property in communication with the apparatus.

7. The apparatus of claim 1, further comprising:
   a database for storing promotion theme parameters and promotion statistics.

8. The apparatus of claim 1, wherein the processor is further designed or configured to generate a cashless transaction thread comprising a plurality of related cashless instrument transactions and provide the promotion in response to properties of the cashless transaction thread matching one or more promotion theme parameters.

9. The apparatus of claim 8, further comprising a transaction database including cashless transaction thread information.

10. The apparatus of claim 8, wherein the plurality cashless instrument transactions comprising the cashless transaction thread are related by one or more of the following a) a property where the cashless instrument transaction is generated, c) a time when the cashless instrument transaction is generated, d) a value of the cashless instrument transaction, f) a characteristic of a gaming device used in the cashless instrument transaction, g) a type of game played on a gaming machine used in the cashless instrument transaction, i) an individual user, j) a group of individual users, k) a group of properties where the cashless instrument transactions are generated, l) a cashless instrument used in the cashless instrument transaction, m) a group of cashless instruments used in the cashless instrument transaction and n) combinations thereof.

11. The apparatus of claim 8, wherein the cashless instrument transactions comprising the cashless instrument thread are one of i) cashless instrument transactions validated at the clearinghouse, ii) cashless instrument transactions validated at one or more gaming properties in communication with the clearinghouse and iii) combinations thereof.

12. The apparatus of claim 8, wherein the properties of the cashless instrument thread are one or more of i) a total amount spent on game play for the cashless instrument transactions comprising the cashless instrument thread, ii) a total amount spent on food purchases for the cashless instrument transactions comprising the cashless instrument thread, iii) a total amount spent on merchandise purchases for the cashless instrument transactions comprising the cashless instrument thread, iv) a total amount spent on service purchases for the cashless instrument transactions comprising the cashless instrument thread, v) a total amount spent on rental purchases for the cashless instrument transactions comprising the cashless instrument thread and vi) combinations thereof.

13. The apparatus of claim 8, wherein the promotion theme parameters are one or more of i) a threshold amount spent on game play, ii) a threshold amount spent on food purchases, iii) a threshold amount spent on merchandise purchases, iv) a threshold amount spent on service purchases, v) a threshold amount spent on rental purchases, vi) a random selection of the cashless instrument thread, vii) a time, viii) a gaming property location, and ix) combinations thereof.

14. The apparatus of claim 8, wherein generating the promotion at the clearinghouse comprises one of initiating i) a download of promotional credits, ii) an issuance of a comp, iii) an issuance of a discount coupon, iv) an issuance of a cash award and v) combinations thereof.

15. The apparatus of claim 14, wherein the promotional credits are non-cashable credits.

16. The apparatus of claim 14, wherein one of the promotional credits, the comp, the discount coupon, the cash award and combinations thereof are stored on a first cashless instrument generated at a cashless instrument generation site including a device in communication with the apparatus or stored in a user account.

17. The apparatus of claim 16, wherein the promotional credits, the comp, the discount coupon, the cash award and combinations thereof stored on the first cashless instrument or stored in the user account are redeemable at a plurality of gaming properties.

18. The apparatus of claim 16, wherein clearinghouse is capable of receiving cashless instrument validation requests for a validation of the promotional credits, the comp, the discount coupon, the cash award and combinations thereof stored on the first cashless instrument or stored in the user account.

19. The apparatus of claim 16, wherein the processor is capable of regulating access to the promotional credits stored on the first cashless instrument or stored in the user account.

20. The apparatus of claim 19, wherein access to the promotional credits is regulated to limit one or more of more of the following: i) a total amount used over a period of time, ii) a total amount used at a particular gaming property, iii) a total amount used at a group of gaming properties, iv) a use of the promotional credits on particular type of gaming machine, v)

a use to a particular group of gaming machines, vi) a use of promotional credits only during certain time periods and vii) combinations thereof.

21. The apparatus of claim 16, wherein the user account is maintained on the apparatus.

22. The apparatus of claim 16, wherein the user account is maintained on a remote server in communication with the apparatus.

23. The apparatus of claim 1, wherein the received cashless instrument validation request is for validating an indicia of credit value to enable i) a wager on a table game, ii) a play of a keno game, iii) a play of a bingo game, iv) a wager on a sporting event, v) a wager on a game of chance played on a gaming device located in a hotel room, vi) a wager on a game of chance on a gaming machine, vii) a food purchase, viii) a service purchase, ix) a merchandise purchase, x) an entertainment event purchase, xi) a rental purchase and xii) combinations thereof.

24. The apparatus of claim 1, wherein the cashless instruments are selected from the group consisting of a smart cart card, a debit card, a bar-coded ticket, a magnetic striped card, a cell phone, a radio frequency identification device, an EZ pay ticket voucher and combinations thereof.

25. The apparatus of claim 24, wherein the processor communicates via the network interface with a plurality of remote devices each of the remote devices maintaining one or more different types of user accounts.

26. The apparatus of claim 24, further comprising:
an account database for storing account information in the user account for a plurality of different game players.

27. The apparatus of claim 26, wherein the account information comprises i) an account number and ii) user identification information.

28. The apparatus of claim 24, further comprising a router.

29. The apparatus of claim 28, wherein the router contains routing information allowing the processor to determine a gaming property location for the user account accessible to the game player.

30. The apparatus of claim 28, wherein the router contains routing information allowing the processor to send information to a device at one of the gaming properties for the user account accessible to the game player.

31. An apparatus for facilitating the use of cashless instruments across separate gaming properties, each of which including at least one device that generates or validates cashless instruments, the apparatus comprising:
a network interface allowing the apparatus to communicate a plurality of cashless systems including with the at least one device at each of the separate gaming properties; and
a processor configured or designed to (i) receive a cashless instrument validation request via the network interface from a first device coupled to a first cashless system located at a first property for a cashless instrument presented for validation at the first property where the cashless instrument was generated at a second property (ii) in response to the cashless instrument validation request, send a message including information stored on the cashless instrument, via the network, to a second device coupled to a second cashless system at the second property requesting the validation of the cashless instrument using the information wherein, after validation, the cashless instrument is redeemable for at least game play credit, iii) transfer an instrument resource stored on the cashless instruments to an user account accessible to a game player.

32. The apparatus of claim 31, wherein the processor is further configured or designed to provide account information stored in one or more different types of user accounts.

33. The apparatus of claim 32, wherein the one or more different types of user accounts are selected from the group consisting a bank account, a credit card account, a debit card account, a clearinghouse account, a casino account and a loyalty program account.

34. The apparatus of claim 32, wherein the account information for the one or more different types of user accounts is stored at i) a clearinghouse, ii) one more gaming properties, and iii) combinations thereof.

35. The apparatus of claim 31, wherein the processor is further designed or configured to enable the transfer of a resource stored on one of a first user account on a first server accessible to the game player, a first gaming device or a first cashless instrument to one of a second gaming device, a second user account on a second server accessible to the game player or a second cashless instrument.

36. The apparatus of claim 35, wherein the resource is one of an indicia of credit or points used in a loyalty program.

37. The apparatus of claim 35, wherein the first gaming device or the second gaming device is a gaming machine.

38. The apparatus of claim 35, wherein the processor is further designed or configured to regulate access to the resource.

39. The apparatus of claim 38, wherein access to the resource is regulated to limit one or more of more of the following: i) a total amount of the resource used over a period of time, ii) a total amount of the resource used at a particular gaming property, iii) a total amount of the resource used at a group of gaming properties, and iv) combinations thereof.

40. The apparatus of claim 35, wherein the first user account or the second user account accessible to the game player is one of a bank account, a loyalty program account, a credit card account, a debit card account, a clearinghouse account and a casino account.

41. The apparatus of claim 31, wherein the received cashless instrument validation request is for validating an indicia of credit value to enable i) a wager on a table game, ii) a play of a keno game, iii) a play of a bingo game, iv) a wager on a sporting event, v) a wager on a game of chance played on a gaming device located in a hotel room, vi) a wager on a game of chance on a gaming machine, vii) a food purchase, viii) a service purchase, ix) a merchandise purchase, x) an entertainment event purchase, xi) a rental purchase and xii) combinations thereof.

42. The apparatus of claim 31, wherein the cashless instruments are selected from the group consisting of a smart cart card, a debit card, a bar-coded ticket, a magnetic striped card, a wireless device and an EZ pay ticket voucher.

43. A method of validating a cashless instrument storing a promotion at a first property using an apparatus where the cashless instrument was generated at a second property, the method comprising,
receiving a first transaction validation request containing transaction information from a first device coupled to a first cashless system at the first property wherein the first transaction validation request requests validation of the cashless instrument storing the promotion wherein the apparatus is operable to at least receive transaction validation requests for cashless instruments redeemable for game play on a gaming machine;
sending a second transaction validation request to a second device coupled to a second cashless system at the second property;

receiving a first transaction validation reply from the second device; and sending a second transaction validation reply to the first device wherein the second transaction validation reply contains transaction information indicating whether the validation of cashless instrument storing the promotion has been approved or has been rejected.

44. The method of claim 43, wherein when validation of the cashless instrument storing the promotion is approved, the cashless instrument is redeemable for one of promotional credits, a comp, a discount coupon, merchandise and combinations thereof.

45. The method of claim 44, wherein the promotional credits are non-cashable credits.

46. The method of claim 43, wherein the cashless instrument storing the promotion is only redeemable at a device located at a specific property.

47. The method of claim 43, wherein the cashless instrument is selected from the group consisting of a smart cart card, a debit card, a bar-coded ticket, a magnetic striped card, a cell phone, a radio frequency identification device, a wireless device and an EZ pay ticket voucher.

48. The method of claim 43, wherein the promotion is comprised of one of restricted credits or non-restricted credits.

* * * * *